United States Patent
Gao et al.

(10) Patent No.: US 12,459,838 B2
(45) Date of Patent: Nov. 4, 2025

(54) HYBRID DIMENSIONAL MATERIAL INTERLAYER REGULATED THIN FILM COMPOSITE NANOFILTRATION MEMBRANE FOR NUTRIENTS RECOVERY

(71) Applicant: Georgia Tech Research Corporation, Atlanta, GA (US)

(72) Inventors: Haiping Gao, Atlanta, GA (US); Yongsheng Chen, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 364 days.

(21) Appl. No.: 18/196,851

(22) Filed: May 12, 2023

(65) Prior Publication Data
US 2023/0365438 A1    Nov. 16, 2023

Related U.S. Application Data

(60) Provisional application No. 63/341,093, filed on May 12, 2022.

(51) Int. Cl.
*C02F 1/56* (2023.01)
*B82Y 30/00* (2011.01)
*C02F 1/44* (2023.01)

(52) U.S. Cl.
CPC .............. *C02F 1/442* (2013.01); *B82Y 30/00* (2013.01); *C02F 1/56* (2013.01)

(58) Field of Classification Search
None
See application file for complete search history.

(56) References Cited

U.S. PATENT DOCUMENTS

4,265,959 A  *  5/1981  Sano ................. C08J 5/2243
                                              428/315.7
6,833,073 B2    12/2004  Agarwal
(Continued)

FOREIGN PATENT DOCUMENTS

CN    103360616 A  *  10/2013
CN    109926027 A  *  6/2019
(Continued)

OTHER PUBLICATIONS

Machine translation (partial) of CN113274893A (Year: 2021).*
(Continued)

*Primary Examiner* — Chester T Barry
(74) *Attorney, Agent, or Firm* — Meunier Carlin & Curfman LLC

(57) ABSTRACT

The present disclosure provides for a membrane comprising a substrate, an interlayer, and a polymer layer, wherein the interlayer is disposed on a surface of the substrate and the polymer layer is disposed on a surface of the interlayer opposite the substrate, further wherein the substrate comprises a thermoplastic, the interlayer comprises a two-dimensional nanomaterial and cellulose nanocrystals (CNC), and the layer comprises a polymer. Further provided herein is a method of water filtration comprising filtering a water mixture through the membrane as disclosed herein. Additionally, a method of separating a first solute and a second solute is provided. Further provided herein is a method of per- and polyfluoroalkyl substance (PFAS) removal comprising filtering a substance comprising PFAS through the membrane as disclosed herein, resulting in a retentate and a permeate.

22 Claims, 15 Drawing Sheets

(56) References Cited

U.S. PATENT DOCUMENTS

| | | | |
|---|---|---|---|
| 2016/0303522 A1 | 10/2016 | Wang et al. | |
| 2020/0231822 A1* | 7/2020 | Jolly | C09D 5/24 |
| 2024/0041027 A1* | 2/2024 | Pérez Larios | A01N 65/12 |

FOREIGN PATENT DOCUMENTS

| | | | | |
|---|---|---|---|---|
| CN | 110090563 A | * | 8/2019 | C02F 1/44 |
| CN | 107446153 B | * | 6/2020 | C08L 29/04 |
| CN | 112275140 A | * | 1/2021 | B01D 67/0006 |
| CN | 113856472 A | * | 12/2021 | B01D 61/027 |
| WO | 2007114308 | | 10/2007 | |

OTHER PUBLICATIONS

Machine translation of CN110090563A (Year: 2019).*
Machine translation of CN117160251A (Year: 2023).*
Machine translation of CN-109926027-A (Year: 2019).*
Machine translation of CN103360616A (Year: 2013).*
Machine translation of CN112275140A (Year: 2021).*
Machine translation of CN113856472A (Year: 2021).*
Bi, R.; Zhang, Q.; Zhang, R.; Su, Y.; Jiang, Z. Thin film nanocomposite membranes incorporated with graphene quantum dots for high flux and antifouling property. J. Membr. Sci. 2018, 553, 17-24.
Bjørlo, A. Intercalation of $CO_2$, water and diglyme in MXenes using molecular simulations. NTNU, 2018.
Chen, G.-E.; Liu, Y.-J.; Xu, Z.-L.; Tang, Y.-J.; Huang, H.-H.; Sun, L., Fabrication and characterization of a novel nanofiltration membrane by the interfacial polymerization of 1,4-diaminocyclohexane (DCH) and trimesoyl chloride (TMC). RSC Advances 2015, 5, (51), 40742-40752.
Choi, H.-g.; Shah, A. A.; Nam, S.-E.; Park, Y.-I.; Park, H. Thin-film composite membranes comprising ultrathin hydrophilic polydopamine interlayer with graphene oxide for forward osmosis. Desalination 2019, 449, 41-49.
Ding, L.; Wei, Y.; Li, L.; Zhang, T.; Wang, H.; Xue, J.; Ding, L.-X.; Wang, S.; Caro, J.; Gogotsi, Y. MXene molecular sieving membranes for highly efficient gas separation. Nat. Commun. 2018, 9 (1), 155.
Ding, L.; Wei, Y.; Wang, Y.; Chen, H.; Caro, J.; Wang, H. A Two-Dimensional Lamellar Membrane: MXene Nanosheet Stacks. Angew. Chem., Int. Ed. 2017, 56 (7), 1825-1829.
Dong, L.-x.; Huang, X.-c.; Wang, Z.; Yang, Z.; Wang, X.-m.; Tang, C. Y. A thin-film nanocomposite nanofiltration membrane prepared on a support with in situ embedded zeolite nanoparticles. Sep. Purif. Technol. 2016, 166, 230-239.
Gao, H.; Wang, Y.; Afolabi, M. A.; Xiao, D.; Chen, Y. Incorporation of Cellulose Nanocrystals into Graphene Oxide Membranes for Efficient Antibiotic Removal at High Nutrient Recovery. ACS Appl. Mater. Interfaces 2021, 13 (12), 14102-14111.
Gao, H.; Zhong, S.; Zhang, W.; Igou, T.; Berger, E.; Reid, E.; Zhao, Y.; Lambeth, D.; Gan, L.; Afolabi, M. A.; Tong, Z.; Lan, G.; Chen, Y. Revolutionizing Membrane Design Using Machine Learning—Bayesian Optimization. Environ. Sci. Technol. 2022, 56 (4), 2572-2581.
Gao, S.; Zhu, Y.; Gong, Y.; Wang, Z.; Fang, W.; Jin, J. Ultrathin polyamide nanofiltration membrane fabricated on brush-painted single-walled carbon nanotube network support for ion sieving. ACS Nano 2019, 13 (5), 5278-5290.
Geise, G. M.; Park, H. B.; Sagle, A. C.; Freeman, B. D.; McGrath, J. E. Water permeability and water/salt selectivity tradeoff in polymers for desalination. J. Membr. Sci. 2011, 369 (1-2), 130-138.
Ghidiu, M.; Lukatskaya, M. R.; Zhao, M.-Q.; Gogotsi, Y.; Barsoum, M. W., Conductive two-dimensional titanium carbide 'clay' with high volumetric capacitance. Nature 2014, 516, (7529), 78.
Ghosh, A. K.; Hoek, E. M. V. Impacts of support membrane structure and chemistry on polyamide-polysulfone interfacial composite membranes. J. Membr. Sci. 2009, 336 (1), 140-148.
Gong, G.; Wang, P.; Zhou, Z.; Hu, Y. New insights into the role of an interlayer for the fabrication of highly selective and permeable thin-film composite nanofiltration membrane. ACS Appl. Mater. Interfaces 2019, 11 (7), 7349-7356.
Gu, J.-E.; Lee, S.; Stafford, C. M.; Lee, J. S.; Choi, W.; Kim, B.-Y.; Baek, K.-Y.; Chan, E. P.; Chung, J. Y.; Bang, J.; Lee, J.-H. Molecular Layer-by-Layer Assembled Thin-Film Composite Membranes for Water Desalination. Adv. Mater. 2013, 25 (34), 4778-4782.
Guo, H.; Li, X.; Yang, W.; Yao, Z.; Mei, Y.; Peng, L. E.; Yang, Z.; Shao, S.; Tang, C. Y. Nanofiltration for drinking water treatment: a review. Front. Chem. Sci. Eng. 2021, 16, 681-698.
Han, Y.; Xu, Z.; Gao, C. Ultrathin graphene nanofiltration membrane for water purification. Adv. Funct. Mater. 2013, 23 (29), 3693-3700.
Hilal, N.; Al-Zoubi, H.; Darwish, N. A.; Mohamma, A. W.; Abu Arabi, M. A comprehensive review of nanofiltration membranes:— Treatment, pretreatment, modelling, and atomic force microscopy. Desalination 2004, 170 (3), 281-308.
Ji, C.; Zhai, Z.; Jiang, C.; Hu, P.; Zhao, S.; Xue, S.; Yang, Z.; He, T.; Niu, Q. J. Recent advances in high-performance TFC membranes: A review of the functional interlayers. Desalination 2021, 500, 114869.
Jiang, C.; Tian, L.; Zhai, Z.; Shen, Y.; Dong, W.; He, M.; Hou, Y.; Niu, Q. J. Thin-film composite membranes with aqueous template-induced surface nanostructures for enhanced nanofiltration. J. Membr. Sci. 2019, 589, 117244.
Jimenez Solomon, M. F.; Bhole, Y.; Livingston, A. G. High flux membranes for organic solvent nanofiltration (OSN)—Interfacial polymerization with solvent activation. J. Membr. Sci. 2012, 423-424, 371-382.
Karan, S.; Jiang, Z.; Livingston, A. G. Sub-10 nm polyamide nanofilms with ultrafast solvent transport for molecular separation. Science 2015, 348 (6241), 1347-1351.
Kattula, M.; Ponnuru, K.; Zhu, L.; Jia, W.; Lin, H.; Furlani, E. P. Designing ultrathin film composite membranes: the impact of a gutter layer. Sci. Rep. 2015, 5 (1), 15016.
Khanzada, N. K.; Farid, M. U.; Kharraz, J. A.; Choi, J.; Tang, C. Y.; Nghiem, L. D.; Jang, A.; An, A. K. Removal of organic micropollutants using advanced membrane-based water and wastewater treatment: A review. Journal of membrane science 2020, 598, 117672.
Khazaei, M.; Arai, M.; Sasaki, T.; Chung, C.-Y.; Venkataramanan, N. S.; Estili, M.; Sakka, Y.; Kawazoe, Y. Novel Electronic and Magnetic Properties of Two-Dimensional Transition Metal Carbides and Nitrides. Adv. Funct. Mater. 2013, 23 (17), 2185-2192.
Lai, G.; Lau, W.; Goh, P.; Ismail, A.; Yusof, N.; Tan, Y. Graphene oxide incorporated thin film nanocomposite nanofiltration membrane for enhanced salt removal performance. Desalination 2016, 387, 14-24.
Li, Y.; Su, Y.; Li, J.; Zhao, X.; Zhang, R.; Fan, X.; Zhu, J.; Ma, Y.; Liu, Y.; Jiang, Z. Preparation of thin film composite nanofiltration membrane with improved structural stability through the mediation of polydopamine. J. Membr. Sci. 2015, 476, 10-19.
Liang, C. Z.; Chung, T.-S.; Lai, J.-Y. A review of polymeric composite membranes for gas separation and energy production. Prog. Polym. Sci. 2019, 97, 101141.
Liang, Y.; Zhu, Y.; Liu, C.; Lee, K.-R.; Hung, W.-S.; Wang, Z.; Li, Y.; Elimelech, M.; Jin, J.; Lin, S. Polyamide nanofiltration membrane with highly uniform sub-nanometre pores for sub-1 Å precision separation. Nat. Commun. 2020, 11 (1), 1-9.
Liao, Z.; Zhu, J.; Li, X.; Van der Bruggen, B. Regulating composition and structure of nanofillers in thin film nanocomposite (TFN) membranes for enhanced separation performance: A critical review. Sep. Purif. Technol. 2021, 266, 118567.
Lin, S.; Hatzell, M.; Liu, R.; Wells, G.; Xie, X. Mining resources from water. Resources, Conservation and Recycling 2021, 175, 105853.
Liu, Y.-l.; Wang, X.-m.; Yang, H.-w.; Xie, Y. F.; Huang, X. Preparation of nanofiltration membranes for high rejection of organic micropollutants and low rejection of divalent cations. J. Membr. Sci. 2019, 572, 152-160.
Long, L.; Wu, C.; Yang, Z.; Tang, C. Y. Carbon Nanotube Interlayer Enhances Water Permeance and Antifouling Performance of Nanofiltra-

(56) References Cited

OTHER PUBLICATIONS tion Membranes: Mechanisms and Experimental Evidence. Environ. Sci. Technol. 2022, 56 (4), 2656-2664.
Marcus, Y., Thermodynamics of solvation of ions. Part 5.—Gibbs free energy of hydration at 298.15 K. Journal of the Chemical Society, Faraday Transactions 1991, 87, (18), 2995-2999.
Mohammad, A. W.; Teow, Y. H.; Ang, W. L.; Chung, Y. T.; Oatley-Radcliffe, D. L.; Hilal, N. Nanofiltration membranes review: Recent advances and future prospects. Desalination 2015, 356, 226-254.
Muckley, E. S.; Naguib, M.; Wang, H.-W.; Vlcek, L.; Osti, N. C.; Sacci, R. L.; Sang, X.; Unocic, R. R.; Xie, Y.; Tyagi, M., Multimodality of structural, electrical, and gravimetric responses of intercalated MXenes to water. ACS nano 2017, 11, (11), 11118-11126.
Nason, J. A.; McDowell, S. A.; Callahan, T. W. Effects of natural organic matter type and concentration on the aggregation of citrate-stabilized gold nanoparticles. J. Environ. Monit. 2012, 14 (7), 1885-1892.
Nishiyama, Y.; Langan, P.; Chanzy, H. Crystal Structure and Hydrogen-Bonding System in Cellulose Iβ from Synchrotron X-ray and Neutron Fiber Diffraction. J. Am. Chem. Soc. 2002, 124 (31), 9074-9082.
Park, H. B.; Kamcev, J.; Robeson, L. M.; Elimelech, M.; Freeman, B. D. Maximizing the right stuff: The trade-off between membrane permeability and selectivity. Science 2017, 356 (6343), 1137.
Rajaeian, B.; Rahimpour, A.; Tade, M. O.; Liu, S. Fabrication and characterization of polyamide thin film nanocomposite (TFN) nanofiltration membrane impregnated with TiO2 nanoparticles. Desalination 2013, 313, 176-188.
Ramon, G. Z.; Wong, M. C. Y.; Hoek, E. M. V. Transport through composite membrane, part 1: Is there an optimal support membrane? J. Membr. Sci. 2012, 415-416, 298-305.
Riazi, H.; Anayee, M.; Hantanasirisakul, K.; Shamsabadi, A. A.; Anasori, B.; Gogotsi, Y.; Soroush, M., Surface modification of a MXene by an aminosilane coupling agent. Advanced Materials Interfaces 2020, 7, (6), 1902008.
Ritt, C. L.; Werber, J. R.; Deshmukh, A.; Elimelech, M. Monte Carlo simulations of framework defects in layered two-dimensional nanomaterial desalination membranes: implications for permeability and selectivity. Environ. Sci. Technol. 2019, 53 (11), 6214-6224.
Sarkar, P.; Modak, S.; Karan, S. Ultraselective and highly permeable polyamide nanofilms for ionic and molecular nano-filtration. Adv. Funct. Mater. 2021, 31 (3), 2007054.
Schmid, N.; Eichenberger, A. P.; Choutko, A.; Riniker, S.; Winger, M.; Mark, A. E.; van Gunsteren, W. F. Definition and testing of the GROMOS force-field versions 54A7 and 54B7. Eur. Biophys. J. 2011, 40 (7), 843.
Sun, H.; Liu, J.; Luo, X.; Chen, Y.; Jiang, C.; Zhai, Z.; Niu, Q. J. Fabrication of thin-film composite polyamide nanofiltration membrane based on polyphenol intermediate layer with enhanced desalination performance. Desalination 2020, 488, 114525.
Sun, P.-F.; Yang, Z.; Song, X.; Lee, J. H.; Tang, C. Y.; Park, H.-D. Interlayered Forward Osmosis Membranes with Ti3C2T x MXene and Carbon Nanotubes for Enhanced Municipal Wastewater Concentration. Environ. Sci. Technol. 2021, 55 (19), 13219-13230.
Tan, Z.; Chen, S.; Peng, X.; Zhang, L.; Gao, C. Polyamide membranes with nanoscale Turing structures for water purification. Science 2018, 360 (6388), 518-521.
Tang, C. Y.; Kwon, Y.-N.; Leckie, J. O., Effect of membrane chemistry and coating layer on physiochemical properties of thin film composite polyamide RO and NF membranes: I. FTIR and XPS characterization of polyamide and coating layer chemistry. Desalination 2009, 242, (1-3), 149-167.
Tang, C. Y.; Yang, Z.; Guo, H.; Wen, J. J.; Nghiem, L. D.; Cornelissen, E. Potable Water Reuse through Advanced Membrane Technology. Environ. Sci. Technol. 2018, 52 (18), 10215-10223.
Wang, Z.; Wang, Z.; Lin, S.; Jin, H.; Gao, S.; Zhu, Y.; Jin, J. Nanoparticle-templated nanofiltration membranes for ultrahigh performance desalination. Nat. Commun. 2018, 9 (1), 1-9.
Wijmans, J.; Hao, P. Influence of the porous support on diffusion in composite membranes. Journal of membrane science 2015, 494, 78-85.
Wu, X.; Ding, M.; Xu, H.; Yang, W.; Zhang, K.; Tian, H.; Wang, H.; Xie, Z. Scalable ti3c2t x mxene interlayered forward osmosis membranes for enhanced water purification and organic solvent recovery. ACS Nano 2020, 14 (7), 9125-9135.
Wu, X.; Yang, L.; Shao, W.; Lu, X.; Liu, X.; Li, M. Fabrication of high performance TFN membrane incorporated with graphene oxide via support-free interfacial polymerization. Science of the Total Environment 2021, 793, 148503.
Xu, R.; Qin, W.; Zhang, B.; Wang, X.; Li, T.; Zhang, Y.; Wen, X. Nanofiltration in pilot scale for wastewater reclamation: Long-term performance and membrane biofouling characteristics. Chemical Engineering Journal 2020, 395, 125087.
Xue, S.; Lin, C.-W.; Ji, C.; Guo, Y.; Liu, L.; Yang, Z.; Zhao, S.; Cai, X.; Niu, Q. J.; Kaner, R. B. Thin-Film Composite Membranes with a Hybrid Dimensional Titania Interlayer for Ultrapermeable Nanofiltration. Nano Lett. 2022, 22 (3), 1039-1046.
Yang, C.; Li, S.; Lv, X.; Li, H.; Han, L.; Su, B. Effectively regulating interfacial polymerization process via in-situ constructed 2D COFs interlayer for fabricating organic solvent nanofiltration membranes. J. Membr. Sci. 2021, 637, 119618.
Yang, X. Controllable Interfacial Polymerization for Nano-filtration Membrane Performance Improvement by the Polyphenol Interlayer. ACS Omega 2019, 4 (9), 13824-13833.
Yang, X.; Du, Y.; Zhang, X.; He, A.; Xu, Z.-K. Nanofiltration membrane with a mussel-inspired interlayer for improved permeation performance. Langmuir 2017, 33 (9), 2318-2324.
Yang, X.; Huang, J.; Yang, F.; Wang, W.; Xue, C.; Zhou, W.; Wu, Y.; Shao, L.; Zhang, Y. Metal-organophosphate biphasic interfacial coordination reaction synthesizing nanofiltration membranes with the ultrathin selective layer, excellent acid-resistance and antifouling performance. J. Membr. Sci. 2022, 653, 120521.
Yang, Z.; Guo, H.; Tang, C. Y. The upper bound of thin-film composite (TFC) polyamide membranes for desalination. J. Membr. Sci. 2019, 590, 117297.
Yang, Z.; Sun, P.-F.; Li, X.; Gan, B.; Wang, L.; Song, X.; Park, H.-D.; Tang, C. Y. A critical review on thin-film nanocomposite membranes with interlayered structure: mechanisms, recent developments, and environmental applications. Environ. Sci. Technol. 2020, 54 (24), 15563-15583.
Yang, Z.; Wang, F.; Guo, H.; Peng, L. E.; Ma, X.-h.; Song, X.-x.; Wang, Z.; Tang, C. Y. Mechanistic Insights into the Role of Polydopamine Interlayer toward Improved Separation Performance of Polyamide Nanofiltration Membranes. Environ. Sci. Technol. 2020, 54 (18), 11611-11621.
Yang, Z.; Zhou, Z.-w.; Guo, H.; Yao, Z.; Ma, X.-h.; Song, X.; Feng, S.-P.; Tang, C. Y. Tannic Acid/Fe3+ Nanoscaffold for Interfacial Polymerization: Toward Enhanced Nanofiltration Performance. Environ. Sci. Technol. 2018, 52 (16), 9341-9349.
Zarrabi, H.; Yekavalangi, M. E.; Vatanpour, V.; Shockravi, A.; Safarpour, M. Improvement in desalination performance of thin film nanocomposite nanofiltration membrane using amine-functionalized multiwalled carbon nanotube. Desalination 2016, 394, 83-90.
Zhang, W.-H.; Yin, M.-J.; Zhao, Q.; Jin, C.-G.; Wang, N.; Ji, S.; Ritt, C. L.; Elimelech, M.; An, Q.-F. Graphene oxide membranes with stable porous structure for ultrafast water transport. Nat. Nanotechnol. 2021, 16 (3), 337-343.
Zhang, X.; Lv, Y.; Yang, H.-C.; Du, Y.; Xu, Z.-K. Polyphenol coating as an interlayer for thin-film composite membranes with enhanced nanofiltration performance. ACS Appl. Mater. Interfaces 2016, 8 (47), 32512-32519.
Zhang, Y.; Cheng, X.; Jiang, X.; Urban, J. J.; Lau, C. H.; Liu, S.; Shao, L. Robust natural nanocomposites realizing unprecedented ultrafast precise molecular separations. Mater. Today 2020, 36, 40-47.
Zhao, H.; Qiu, S.; Wu, L.; Zhang, L.; Chen, H.; Gao, C. Improving the performance of polyamide reverse osmosis membrane by incorporation of modified multi-walled carbon nanotubes. J. Membr. Sci. 2014, 450, 249-256.
Zhu, J.; Qin, L.; Uliana, A.; Hou, J.; Wang, J.; Zhang, Y.; Li, X.; Yuan, S.; Li, J.; Tian, M.; Lin, J.; Van der Bruggen, B. Elevated

(56) References Cited

OTHER PUBLICATIONS performance of thin film nanocomposite membranes enabled by modified hydrophilic MOFs for nanofiltration. ACS Appl. Mater. Interfaces 2017, 9 (2), 1975-1986.

Zhu, X.; Cheng, X.; Luo, X.; Liu, Y.; Xu, D.; Tang, X.; Gan, Z.; Yang, L.; Li, G.; Liang, H. Ultrathin Thin-Film Composite Polyamide Membranes Constructed on Hydrophilic Poly(vinyl alcohol) Decorated Support Toward Enhanced Nanofiltration Performance. Environ. Sci. Technol. 2020, 54 (10), 6365-6374.

* cited by examiner

HYBRID DIMENSIONAL MATERIAL INTERLAYER REGULATED THIN FILM COMPOSITE NANOFILTRATION MEMBRANE FOR NUTRIENTS RECOVERY

CROSS-REFERENCE TO RELATED APPLICATIONS

This application claims the benefit of and priority to U.S. Patent Application No. 63/341,093 filed on May 12, 2022, the disclosure of which is expressly hereby incorporated by reference herein in its entirety.

STATEMENT OF GOVERNMENT SUPPORT

This invention was made with government support under Grant No. 2018-68011-28371, awarded by the U.S. Department of Agriculture. The government has certain rights in the invention.

BACKGROUND

Global water scarcity is one of the foremost challenges of today. To address the global water shortage issue, water purification techniques have been increasingly demanded to produce safe and clean water from unconventional water resources such as wastewater, brackish water, and seawater.

Membrane-based processes, especially nanofiltration (NF), have been of great interest in water purification and reuse, ascribing to their superior energy efficiency and better water quality than conventional water treatment processes. Typically, modern NF membranes are fabricated through interfacial polymerization (IP) involving amine monomer in the aqueous phase and acyl chloride in the organic phase to form a selective polyamide (PA) layer on a porous substrate. The structural and surface chemical properties play dominant roles in the performance of PA-based thin film composite (TFC) NF membranes. Although TFC NF membranes have been widely applied in water treatment, the conventional TFC NF membranes still suffer from low separation selectivity and intrinsic permeability-selectivity trade-off.

Recently, growing research interest has been seen in tailoring the formation of a PA layer to achieve better separation performance by including an interlayer between the porous substrate and the active layer. By introducing a series of interlayers, the formation of a PA network could potentially be regulated by controlling the diffusion of the amine monomer and the reaction rate of the IP process. The well-stacked water channels formed by 2D materials with large aspect ratios have been reported to cause high mass transfer resistance owing to the tortuous water channels. The existing efforts on interlayer-regulated NF membranes have been primarily centered on achieving high salt rejection for brackish water desalination.

The products and methods disclosed herein address these and other needs.

SUMMARY

In accordance with the purposes of the disclosed materials and methods, as embodied and broadly described herein, the disclosed subject matter, in one aspect, relates to membranes and methods of using thereof, e.g., for the removal of heavy metals and emerging contaminants for resource recovery and potable water reuse.

Thus, in one example, a membrane is provided, including a substrate, an interlayer, and a polymer layer, wherein the interlayer is disposed on a surface of the substrate, and the polymer layer is disposed on a surface of the interlayer opposite the substrate, further wherein the substrate comprises a thermoplastic, the interlayer comprises a two-dimensional nanomaterial and cellulose nanocrystals (CNC), and the layer comprises a polymer.

In a further example, a method of water filtration is provided, including filtering a water mixture through the membrane.

Additionally, a method of separating a first solute and a second solute is provided, including filtering a substance comprising the first solute and the second solute with the membrane, resulting in a retentate and permeate, wherein the retentate comprises the first solute and the permeate comprises the second solute.

In an additional example, a method of per- and polyfluoroalkyl substance (PFAS) removal is provided, including filtering a substance comprising PFAS through the membrane, resulting in a retentate and a permeate.

Thin film composite (TFC) nanofiltration (NF) has been of great interest in water treatment and resource recovery. Nevertheless, the separation performance of TFC NF membranes is limited by their intrinsic permeability-selectivity trade-off. Presented herein is the fabrication of a TFC NF membrane by introducing a hybrid dimensional MXene/CNC framework serving as an interlayer. This hybrid dimensional interlayer regulated the interfacial polymerization process, resulting in a textured surface structure with a large surface area and a highly cross-linked polyamide (PA) network. Importantly, the intercalation of CNC into the MXene stack alleviated the constraint of the tortuous water pathways in the 2D channels, promoting the gutter effect of the MXene/CNC interlayer. The enlarged membrane surface area, together with the gutter effect of the highly permeable interlayer, contributed to the substantially enhanced water permeability (31.68 LMH bar$^{-1}$) without compromising the rejection of various salts (99.51% for $Na_2SO_4$) and antibiotics (>80%). Therefore, the tailored PA-MxC$_{35}$ membrane could overcome the upper bound of the permeability-selectivity trade-off. The simulated water transport using computational modeling showed evidence of the gutter effect of the MXene/CNC framework. The methods provided herein can be used in a 2D materials-based hybrid framework in rationally design fit-for-purpose separation membranes.

Additional advantages will be set forth in part in the description that follows, and in part will be obvious from the description or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

Figures 1A, 1B, 1C, 1D:
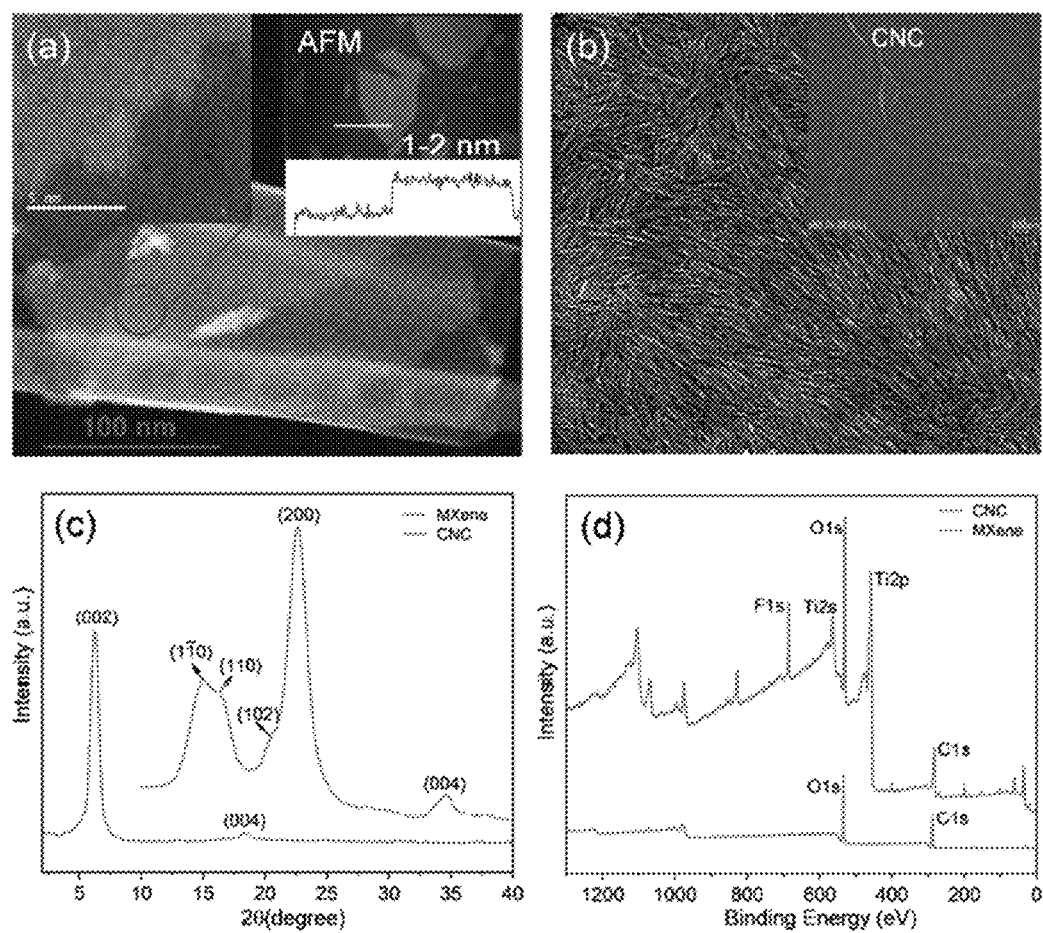
FIGS. 1A-1D show TEM and AFM images of the MXene nanosheet (FIG. 1A), SEM image of the CNC nanorod (FIG. 1B), XRD patterns of MXene and CNC (FIG. 1C), and XPS spectra of MXene and CNC (FIG. 1D).

The following description of the disclosure is provided as an enabling teaching of the disclosure in its best, currently known embodiments. Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As can be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to the arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It can be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by," "comprising," "comprises," "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a compound", "a composition", or "a disorder", includes, but is not limited to, two or more such compounds, compositions, or disorders, and the like.

It should be noted that ratios, concentrations, amounts, and other numerical data can be expressed herein in a range format. It can be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it can be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'."

It is to be understood that such a range format is used for convenience and brevity and, thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5% but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter, or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise. As used herein, the term "substantially free," when used in the context of a composition or component of a composition that is substantially absent, is intended to refer to an amount that is then about 1% by weight or less, e.g., less than about 0.5% by weight, less than about 0.1% by weight, less than about 0.05% by weight, or less than about 0.01% by weight of the stated material, based on the total weight of the composition.

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, a portion of a molecule, a cluster of molecules, molecular complex, moiety, or atom are disclosed herein and can be accomplished by methods known in the art, e.g., protonation, deprotonation, oxidation, reduction, alkylation, acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "alkyl" refers to saturated, straight-chained, or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acetal, acyl, alkyl, alkoxy, alkenyl, alkynyl, aryl, heteroaryl, aldehyde, amino, cyano, carboxylic acid, ester, ether, carbonate ester, carbamate ester, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphthyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acetal, acyl, aldehyde, amino, cyano, carboxylic acid, ester, ether, carbonate ester, carbamate ester, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The terms "amide" or "amido" as used herein are represented by the formula —C(O)NZ$^1$Z$^2$, where Z$^1$ and Z$^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

"Z$^1$," "Z$^2$," "Z$^3$," and "Z$^4$" are used herein as generic symbols to represent various specific substituents. These symbols can be any substituent, not limited to those disclosed herein, and when they are defined to be certain substituents in one instance, they can, in another instance, be defined as some other substituents.

The term "ether" as used herein is represented by the formula Z$^1$OZ$^2$, where Z$^1$ and Z$^2$ can be, independently, an alkyl, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —S(O)$_2$Z$^1$, where Z$^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide," as used herein, comprises the formula —S—.

"R$^1$," "R$^2$," "R$^3$," "R$^n$," etc., where n is some integer, as used herein can, independently, possess one or more of the groups listed above. For example, if R$^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Product

Membrane

Provided herein is a membrane comprising a substrate, an interlayer, and a polymer layer, wherein the interlayer is disposed on a surface of the interlayer opposite the substrate, further wherein the substrate comprises a thermoplastic, the interlayer comprises a two-dimensional nanomaterial and cellulose nanocrystals (CNC), and the layer comprises a polymer.

Thermoplastic polymers, like all polymers, are made up of small molecules called monomers, which form long chains via the process of polymerization. For example, one thermoplastic polymer chain can comprise thousands of monomers. Thermoplastic polymers include, but are not limited to, polyethylene (PE), polypropylene (PP), polyvinyl chloride (PVC), polystyrene (PS), polyethylene terephthalate (PET), polybutylene terephthalate (PBT), and polysulfones.

Two-dimensional nanomaterials are composed of thin layers that can have a thickness of at least one atomic layer. These nanomaterials have a high aspect ratio (surface-area-to-volume ratio) and therefore have many atoms on their surface. Two-dimensional nanomaterials can transverse dimensions larger than 100 nm and can have a thickness of less than 5 nm. Examples of two-dimensional nanomaterials include, but are not limited to, graphene, phosphorene, graphite oxide, molybdenum disulfide, tungsten disulfide, and Mxenes.

As used herein, cellulose nanocrystal refers to a cellulosic object that includes the predominately crystalline regions extracted from cellulose, wherein those regions do not exhibit branches or entanglement between the CNCs or network-like structures.

In some examples, the thermoplastic comprises a polysulfone. Polysulfones are a high temperature, amber-colored, semi-transparent thermoplastic. Polysulfones contain an aryl-$SO_2$-aryl subunit. Polysulfones can include, but are not limited to, polysulfone (PSU), polyether sulfone (PES), and polyphenylene sulfone (PPSU).

In further examples, the polysulfone comprises a polyether sulfone (PES). Polyether sulfone is an amorphous, transparent, and pale amber high-performance thermoplastic. PES is a highly temperature resistant transparent thermoplastic resin and has a relatively high water absorption. The formula for PES is seen in Formula I.

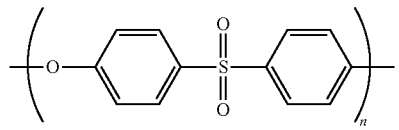

Formula I

In certain examples, the CNC are intercalated into the two-dimensional nanomaterial. Intercalation refers to a process via which a guest molecule or ion is inserted into a host lattice. Intercalation can be used to tune physical and chemical properties of two-dimensional material due to the van der Waals gaps in the lattice that can host high-density intercalated guest matter. The intercalated CNC as disclosed herein contributes to the membrane's ability to be designed and modified for specific and distinct separation purposes as desired by the user.

In specific examples, the two-dimensional nanomaterial comprises Mxene. Mxene is a class of two-dimensional inorganic compounds that comprise atomically thin layers of transition metal carbides, nitrides, or carbonitrides. MXenes can include, but are not limited to, $Ti_2C$, $V_2C$, $Nb_2C$, $Mo_2C$, $Mo_2N$, $Ti_2N$, $(Ti_{2-y}Nb_y)C$, $(V_{2-y}Nb_y)C$, $(Ti_{2-y}V_y)C$, $W_{1.33}C$, $Nb_{1.33}C$, $Mo_{1.33}C$, $Mo_{1.33}Y_{0.67}C$, $Ti_3C_2$, $Ti_3CN$, $Zr_3C_2$, $Hf_3C_2$, and $Ti_4C_3O_2$.

In some examples, the Mxene comprises $Ti_4C_3O_2$.

In further examples, the two-dimensional nanomaterial comprises graphite oxide, molybdenum disulfide, tungsten disulfide, or any combination thereof.

In certain examples, the membrane comprises from about 10 to 14% of CNC by weight. In some examples, the membrane comprises from about 10 to 11%, 10 to 12% or 10 to 13% of CNC by weight. In further examples, the membrane comprises from about 11 to 12%, 12 to 13%, or 13 to 14% of CNC by weight. In certain examples, the membrane comprises from 11.0 to 11.2%, 11.2 to 11.4%, 11.4 to 11.6%, 11.6 to 11.8%, 11.8 to 12.0%, 12.0 to 12.2%, 12.2 to 12.4%, 12.4 to 12.6%, 12.6 to 12.8%, or 12.8 to 13.0% of CNC by weight. In specific examples, the membrane comprises from 11.0 to 11.4%, 11.0 to 11.6%, 11.0 to 11.8%, 11.0 to 12.0%, 11.0 to 12.2%, 11.0 to 12.4%, 11.0 to 12.6%, 11.0 to 12.8%, or 11.0 to 13.0% of CNC by weight. In some examples, the membrane comprises from 11.5 to 11.6%, 11.6 to 11.7%, 11.7 to 11.8%, 11.8 to 11.9%, 11.9 to 12.0%, 12.0 to 12.1%, 12.1 to 12.2%, 12.2 to 12.3%, 12.3 to 12.4%, or 12.4 to 12.5%. In further examples, the membrane comprises from 11.5 to 11.7%, 11.5 to 11.8%, 11.5 to 11.9%, 11.5 to 12.0%, 11.5 to 12.1%, 11.5 to 12.2%, 11.5 to 12.3%, 11.5 to 12.4%, or 11.5 to 12.5%.

In specific examples, the polymer comprises a polyamide. Polyamide refers to a polymer with repeating units linked by amide bonds. Polyamides can occur both naturally and artificially. The polyamide structure is shown in Formula II.

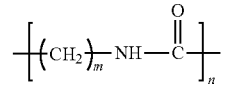

Formula II

In some examples, the membrane has a pore size of from 0.30 nm to 0.40 nm. In further examples, the membrane has a pore size of from 0.30 nm to 0.32 nm, 0.32 nm to 0.34 nm, 0.34 nm to 0.36 nm, 0.36 nm to 0.38 nm, or 0.38 nm to 0.40 nm. In some certain examples, the membrane has a pore size of from 0.30 nm to 0.34 nm, 0.30 nm to 0.36 nm, 0.30 nm to 0.38 nm, or 0.30 nm to 0.40 nm. In certain examples, the membrane has a pore size of from 0.30 nm to 0.31 nm, 0.31 nm to 0.32 nm, 0.32 nm to 0.33 nm, 0.33 nm to 0.34 nm, 0.35 nm to 0.36 nm, 0.36 nm to 0.37 nm, 0.37 nm to 0.38 nm, 0.38 nm to 0.39 nm, or 0.39 nm to 0.40 nm.

In further examples, the membrane has a molecular weight cut-off (MWCO) of a range from 261 Da to 336 Da. In some examples, the membrane has a MWCO of from 261 Da to 270 Da, 270 Da to 280 Da, 280 Da to 290 Da, 290 Da to 300 Da, 300 Da to 310 Da, 310 Da to 320 Da, 320 Da to 330 Da, or 330 Da to 336 Da. In further examples, the membrane has an MWCO of from 261 Da to 280 Da, 261 Da to 290 Da, 261 Da to 300 Da, 261 Da to 310 Da, 261 Da to 320 Da, 261 Da to 330 Da, or 261 Da to 336 Da. In certain examples, the membrane has a MWCO of from 261 Da to 265 Da, 265 Da to 270 Da, 270 Da to 275 Da, 275 Da to 280 Da, 280 Da to 285 Da, 285 Da to 290 Da, 290 Da to 295 Da, 295 Da to 300 Da, 300 Da to 305 Da, 305 Da to 310 Da, 310 Da to 315 Da, 315 Da to 320 Da, 320 Da to 325 Da, 325 Da to 330 Da, 330 Da to 336 Da. In certain examples, the membrane has an MWCO of from 261 Da to 275 Da, 261 Da to 285 Da, 261 Da to 295 Da, 261 Da to 305 Da, 261 Da to 315 Da, 261 Da to 325 Da, or 261 Da to 336 Da.

In certain examples, the membrane has a cross-linking degree of a range from 74.64% to 89.1%. In some examples, the membrane has a cross-linking degree of from 74.64% to 76%, 76% to 78%, 78% to 80%, 80% to 82%, 82% to 84%, 84% to 86%, 86% to 88%, or 88% to 89.1%. In further examples, the membrane has a cross-linking degree of from 74.64% to 78%, 74.64% to 80%, 74.64% to 82%, 74.64% to 84%, 74.64% to 86%, 74.64% to 88%, or 74.64% to 89.1%.

In specific examples, the membrane has a water permeability of a range from 17.81 to 31.68 LMH $bar^{-1}$. In some examples, the membrane has a water permeability of a range from 17.81 to 19, 19 to 21, 21 to 23, 23 to 25, 25 to 27, 27 to 29, and 29 to 31.68 LMH $bar^{-1}$. In further examples, the membrane has a water permeability of from 17.81 to 21, 17.81 to 23, 17.81 to 25, 17.81 to 27, 17.81 to 29, 17.81 to 31.68 LMH $bar^{-1}$.

In some examples, the membrane rejects from 99.0 to 99.8% of salt ions. Salt ions can include, but are not limited to, $SO_4^{2-}$, $Ca^{2+}$, and $Mg^{2+}$. In further examples, the membrane rejects from 99.0 to 99.1%, 99.1 to 99.2%, 99.2 to 99.3%, 99.3 to 99.4%, 99.4 to 99.5%, 99.5 to 99.6%, 99.6 to 99.7%, and 99.7 to 99.8% of salt ions.

In some examples, the membrane rejects 80% or more of heavy metal ions. Heavy metal ions can include $Pb^{2+}$ and Cu$^{2+}$. In some examples, the membrane rejects 80% or more, 82% or more, 84% or more, 86% or more, 88% or more, 90% or more, 92% or more, 94% or more, 96% or more, or 98% or more.

In further examples, the membrane rejects 80% or more of antibiotics. In some examples, the membrane rejects 80% or more, 82% or more, 84% or more, 86% or more, 88% or more, 90% or more, 92% or more, 94% or more, 96% or more, or 98% or more.

Method

Method of Water Filtration

The present disclosure, in one aspect, provides for a method of water filtration comprising filtering a water mixture through the membrane, as disclosed herein.

Method of Separating a First Solute and a Second Solute

The present disclosure, in one aspect, provides for a method of separating a first solute and a second solute comprising filtering a substance comprising the first solute and the second solute with the membrane of claim 1, resulting in a retentate and permeate, wherein the retentate comprises the first solute and the permeate comprises the second solute.

Retentate refers to the fluid that contains the component retained by the membrane. Permeate refers to the fluid that passes through the membrane.

The solute can include but is not limited to piperazine (PIP) and trimesoyl chloride (TMC). The Mxene/CNC framework in the interlayer enables regulation of the interfacial polymerization process that occurs in the membrane can contribute to the ability to perform solute-solute separation with the membrane.

Method of Per- and Polyfluoroalkyl Substance (PFAS) Removal

The present disclosure, in one aspect, provides for a method of PFAS removal comprising filtering a substance comprising PFAS through the membrane of claim 1, resulting in a retentate and a permeate.

PFAS comprises molecules that are made up of a chain of linked carbon and fluorine atoms. Because of the strength of a carbon-fluorine bond, PFAS can degrade very slowly, or not at all, in the environment. PFAS can be used in nonstick coatings on cookware, stain-resistant clothes and carpets, or firefighting foam, to make it more effective. Further, PFAS can be used in industries such as aerospace, automotive, construction, electronics, and military equipment. Currently, more than 9,000 PFAS have been identified. Due to the fact that PFAS can persist in the environment for an unknown amount of time and gradually accumulate and remain in the human body, there has been an increase in concerns regarding the public health impact of PFAS.

PFAS include, but are not limited to, perfluorooctanoic acid (PFOA), perfluorooctyl sulfonate (PFOS), hexafluoropropylene oxide (HFPO) dimer acid, and their ammonium, sodium, and potassium salts, or any combination thereof. Further examples of PFAS include N-ethyl perfluorooctanesulfonamidoacetic acid, N-methyl perfluorooctanesulfonamidoacetic acid, perfluorobutanesulfonic acid, perfluorodecanoic acid, perfluorododecanoic acid, perfluoroheptanoic acid, perfluorohexanesulfonic acid, perfluorohexanoic acid, and perfluorononanoic acid. In certain examples, PFAS comprise perfluorooctanoic acid (PFOA), perfluorooctane sulfonate (PFOS), or any combination thereof.

In some examples, the retentate comprises the PFAS.

In further examples, the permeate is substantially free of PFAS. In some examples, the permeate comprises from 0 parts per trillion to 140,000 parts per trillion of PFAS (e.g., 0 to 20,000 parts per trillion, 20,000 to 40,000 parts per trillion, 40,000 to 60,000 parts per trillion, 60,000 to 80,000 parts per trillion, 80,0000 to 100,000 parts per trillion, 100,0000 to 120,000 parts per trillion, or 120,000 to 140,000 parts per trillion). In further examples, the permeate (104) comprises 140,000 parts per trillion or less (e.g., up to 140,000 parts per trillion, up to 130,000 parts per trillion, up to 120,000 parts per trillion, up to 110,000 parts per trillion, up to 100,000 parts per trillion, up to 90,000 parts per trillion, up to 80,000 parts per trillion, up to 70,000 parts per trillion, up to 60,000 parts per trillion, up to 50,000 parts per trillion, up to 40,000 parts per trillion, up to 30,000 parts per trillion, up to 20,000 parts per trillion, or up to 10,000 parts per trillion). In certain examples, the permeate (104) comprises from 0 parts per trillion to 1,000 parts per trillion (e.g., 0 to 100 parts per trillion, 100 to 200 parts per trillion, 200 to 300 parts per trillion, 300 to 400 parts per trillion, 400 to 500 parts per trillion, 500 to 600 parts per trillion, 600 to 700 parts per trillion, 700 to 800 parts per trillion, 800 to 900 parts per trillion, or 900 to 1,000 parts per trillion). In specific examples, the permeate 9104) comprises from 0 parts per trillion to 100 parts per trillion (e.g., 0 to 10 parts per trillion, 10 to 20 parts per trillion, 20 to 30 parts per trillion, 30 to 40 parts per trillion, 40 to 50 parts per trillion, 50 to 60 parts per trillion, 60 to 70 parts per trillion, 70 to 80 parts per trillion, 80 to 90 parts per trillion, or 90 to 100 parts per trillion).

In certain examples, the permeate is free of PFAS.

A number of embodiments of the disclosure have been described. Nevertheless, it will be understood that various modifications may be made without departing from the spirit and scope of the invention. Accordingly, other embodiments are within the scope of the following claims.

By way of non-limiting illustration, examples of certain embodiments of the present disclosure are given below.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.), but some errors and deviations should be accounted for. Unless indicated otherwise, parts are parts by weight, the temperature is in ° C. or is at ambient temperature, and pressure is at or near atmospheric. There are numerous variations and combinations of reaction conditions, e.g., component concentrations, temperatures, pressures, and other reaction ranges and conditions, that can be used to optimize the product purity and yield obtained from the described process. Only reasonable and routine experimentation will be required to optimize such process conditions.

A study was conducted that fabricated, by way of examples provided below, an interlayer regulated NF membrane by introducing a hybrid dimensional MXene/CNC framework with permeability-selectivity upper-bound breaking performance as well as high heavy metal ions and antibiotics retention capacity. The MXene/CNC framework served as the highly permeable gutter layer, significantly minimizing the distance of water transport through the PA layer. The study validated the gutter effect of the interlayer by developing a water transport model in COMSOL. Additionally, the inclusion of the MXene/CNC interlayer regulated the IP process, leading to the formation of a textured PA layer enabling a larger specific filtration area. The resultant NF membrane exhibited nearly doubled water permeability (31.68 LMH bar$^{-1}$) compared to the conventional TFC membrane (17.81 LMH bar$^{-1}$) without sacrificing the rejection of salts and emerging contaminants. Findings suggest that a hybrid dimensional 2D materials-based interlayer can be constructed that tailors the PA structural and surface properties to achieve a high-performance separation membrane, which can be applied broadly in water purification, water reuse, and resource recovery.

Example 1: Hybrid Dimensional MXene/CNC Framework-Regulated Nanofiltration Membrane with High Separation Performance Introduction A series of PA-based NF membranes were prepared by introducing the hybrid dimensional MXene/CNC framework as the interlayer to regulate the IP process. The influence of the interlayer on the formation of a PA layer was investigated by performing comprehensive characterizations. Membrane separation performance was evaluated using different salts, heavy metals, and antibiotics. The textured surface structure, together with the highly cross-linked degree of the PA network, endowed the membrane with the capability to outperform the upper-bound of permeability-selectivity of the conventional TFC membrane while achieving desirable heavy metals and antibiotics removal. The water transport was simulated by developing a computational model in COMSOL and validated the gutter effect of the highly permeable MXene/CNC interlayer. Furthermore, the diffusion of PIP in the system with/without the presence of the MXene/CNC framework was explored using molecular dynamics (MD) simulation, revealing the mechanistic insights into the formation of the PA layer with a high degree of cross-linking.

Materials and Methods

Chemicals and Materials

Lithium fluoride, hydrochloric acid (HCl, 37%, ACS Reagent), piperazine (PIP, ≥99%), 1,3,5-benzenetricarbonyl trichloride (TMC, ≥98%), n-hexane (anhydrous, ≥98%), glycerol (≥99.5%), glucose (≥99%), poly(ethylene glycol) (PEG, Mw=300, 400, and 600 Da, BioUltra), NaCl (≥99%), Na$_2$SO$_4$ (≥99%), MgCl$_2$ (≥99%), CaCl$_2$ (≥97%), PbCl$_2$ (99.99%), CuCl$_2$ (99.99%), Levofloxacin (LEVO, 98.0-102.0%, anhydrous basis, HPLC), Sulfamethoxazole (SMX, analytical standard), and Trimethoprim (TMP, ≥99%, HPLC) were purchased from Millipore Sigma. Formic acid (Optima LC/MS), nitric acid (trace metal grade), and methanol (for HPLC) were obtained from Fisher Scientific.

MAX powder was supplied by Luoyang Tongrun Info Technology Co., Ltd., China. Cellulose nanocrystal (CNC) was obtained from MSE supplies LLC, U.S. Commercial polyether sulfone (PES, 0.2 μm) and NF270 membranes (Dow filmtech flat sheet membrane, PA-TFC, NF) were purchased from Sterlitech Corporation, U.S.

Fabrication of MXene/CNC Interlayer Regulated NF Membrane

MXene (Ti$_3$C$_2$T$_x$) nanosheets were obtained by selective etching of the Al layer from the Ti$_3$AlC$_2$ (MAX phase) using in situ hydrofluoric (HF) forming etchant, lithium fluoride, and hydrochloric acid (HCl) following previously reported methods with slight modification. (Lin, 2021; Hilal, 2004) In detail, 1.6 g of LiF was dissolved in 20 mL of 9 M HCl solution under stirring for 10 min at room temperature. Then, 1.0 g Ti$_3$AlC$_2$ power (MAX) was slowly added to avoid the initial overheating of the exothermic reaction. After etching at 35° C. for 24 h under magnetic stirring, the resulting solution was washed with deionized water through several cycles of centrifugation (10 min for each cycle at 3500 rpm) until the pH value of the supernatant was neutral (>6). To delaminate Ti$_3$C$_2$T$_x$ into monolayer nanosheets (d-Ti$_3$C$_2$T$_x$ MXene), the obtained precipitates were redispersed into 200 mL of DI water followed by ultrasonication for 2 h under flowing Argon gas. The stable MXene colloidal solution in a dark green color was collected after centrifugation at 3500 rpm for 1 h and stored at 4° C. before fabricating membranes.

The solutions containing the synthesized MXene and CNC at varied mass ratios were mixed under sonication in an ice bath for 10 min to obtain a uniform MXene/CNC solution. The resulting mixture was filtered onto a hydrophilic PES membrane (0.2 μm in pore size) via vacuum-assisted filtration. The MXene/CNC deposited PES substrate was denoted as MxC$_i$, where i represents the percentage by weight of incorporated CNC.

An IP reaction was executed on the prepared MxC$_i$ substrates to fabricate the interlayer-regulated PA-based NF membranes. In brief, the substrate was secured on a glass plate with a glass funnel. Then, an aqueous solution of 0.25 wt % PIP was gently poured onto the substrate for 3 min. After discarding the PIP solution, the excess solution on the substrate surface was removed with a rubber roller. Subsequently, a 0.3 wt % TMC solution (in n-Hexane) was introduced to the PIP-impregnated substrate for 1 min to activate the IP reaction. The obtained membrane was rinsed with n-Hexane to remove the unreacted TMC and then heat cured in an oven for 10 min at 60° C. The resultant NF membranes defined as PA-MxC$_i$, were stored at 4° C. before testing. The value of i represents the percentage by weight of the incorporated CNC in the MXene/CNC hybrid interlayer. For comparison, a conventional NF membrane was fabricated by forming the PA layer on a pristine PES substrate (referred to as the TFC membrane) using the identical fabrication conditions as those used for fabricating the PA-MxC$_i$ membranes.

Characterization of Materials and Membranes

Membrane surface morphology was observed using field emission scanning electron microscopy (FESEM, Hitachi SU8010). The interlayer spacing of the MXene, CNC, and the fabricated substrate was characterized by utilizing the X' Pert PRO Alpha-1 XRD with Cu Kα radiation at a step scan of 0.02°, with an overstep time of 0.05 s. The elemental compositions of MXene nanosheets, CNC nanorods, and membrane surfaces were investigated using K-Alpha X-ray photoelectron spectroscopy (XPS, Thermo Fisher Scientific), from which the cross-linking degree of the PA active layer was calculated. The functionality of the membrane surface was determined using a Frontier transform infrared spectrometer equipped with a diamond crystal attenuated total reflectance (ATR-FTIR, Nicolet 6700, Thermo Fisher Scientific). The surface roughness of the membrane was measured with a Dimension Icon atomic force microscope (AFM, Bruker). The static contact angle (CA) was measured with a Rame-hart standard contact angle Goniometer (Model 250, Rame-hart Instrument Co.) to indicate the hydrophilicity of the membrane surface. The zeta potential of the MXene/CNC solution was determined using a Malvern Zetasizer (Nano ZS ZEN). The membrane surface zeta potential was determined using the same Zetasizer with a surface zeta potential cell.

Analytical Methods

The concentrations of glycerol, xylose, and PEGs were measured using a TOC-VCPH total organic carbon analyzer (Shimadzu Corp., Japan). The concentrations of cations and anions were analyzed by a Dionex DX500 ion chromatograph (Dionex Corp., U.S.A.), while concentrations of heavy metal ions were determined by an inductively coupled plasma-optical emission spectrometry (ICP-OES). The emerging contaminates were quantified using high-performance liquid chromatography (HPLC, Agilent 1200 series) with a diode array detector. The column used was a ZORBAX Eclips Plus C 18 (3.0×150 mm, 3.5 μm), and the working temperature was set at 40° C. Gradient elusion with methanol as mobile phase A and 0.1% formic acid in D.I. water (v/v) as mobile phase B was utilized to analyze the concentrations of LEVO, SMX, and TMP. The sample injection volume of 25 μL was adopted for all samples. The detailed physiochemical properties of the targeted ions and antibiotics were listed in Tables 1 and 2.

TABLE 1

The crystal, Stokes, hydrated radii, and hydration free energy of tested ions.

| | Crystal radius[a] (Å) | Stokes radius[a] (Å) | Hydrated radius[a] (Å) | Hydration free energy (kJ mol$^{-1}$)[b] Salt | Salt used |
|---|---|---|---|---|---|
| Anions | | | | | |
| Cl$^-$ | 1.81 | 1.21 | 3.32 | −340 | NaCl |
| SO$_4^{2-}$ | 2.90 | 2.30 | 3.79 | −1080 | Na$_2$SO$_4$ |
| Cations | | | | | |
| Na+ | 0.95 | 1.84 | 3.58 | −365 | NaCl |
| Mg2+ | 0.65 | 3.47 | 4.28 | −1830 | MgCl$_2$ |
| Ca2+ | 0.99 | 3.10 | 4.12 | −1505 | CaCl$_2$ |
| Pb2+ | 1.32 | 2.83 | 4.01 | −1425 | PbCl$_2$ |
| Cu2+ | 0.72 | 3.25 | 4.19 | −2010 | CuCl$_2$ |

[a]Data from Liang, Y. (2020);
[b]Data from Marcus, Y. (1991)

TABLE 2

Physicochemical properties of three representative antibiotics.

| | Category | Molecular Weight (g mol$^{-1}$) | pKa | Charge (pH~6.0) | Stokes Radius (Å) |
|---|---|---|---|---|---|
| Sulfamethoxazole (SMX) | Antibiotics | 253.28 | 1.6, 5.7 | −0.69 | 3.38 |
| Levofloxacin (LEVO) | Antibiotics | 361.37 | 5.35, 6.25 | −0.25 | 4.55 |
| Trimethoprim (TMP) | Antibiotics | 290.32 | 7.16 | +0.98 | 4.19 |

Evaluation of Membrane Separation Performance

The membrane separation performance was evaluated using a bench-scale crossflow filtration system with an effective working area of 4.1 cm$^2$. A hydraulic pressure of 4 bar and a crossflow velocity of 0.5 m s$^{-1}$ were applied to all the tests. For solutes rejection tests, a water matrix containing each targeted salt at a concentration of 1.0 g L$^{-1}$ as well as 1.0 mg L$^{-1}$ of each emerging contaminant and heavy metal was used as the feed solution. The volume for each of the feed solutions was 2.0 L. The permeate and concentrate were recirculated back to the feed tank during filtration. Permeate and feedwater samples were taken at scheduled times through a 6 h filtration process. To evaluate the long-term operational stability of the fabricated membrane, water permeability and salt rejection testing up to 50 h were also performed for the optimal membrane. Water permeability (A, LMHbar$^{-1}$), salt rejection (R, %), and water/salt selectivity (A/B, bar$^{-1}$) were calculated according to the following equations (Yang, 2019):

$$A = \frac{\Delta V}{A \Delta P \Delta t}$$

$$R = \frac{C_f - C_p}{C_f} \times 100\%$$

$$\frac{A}{B} = \frac{R}{(1-R) \times (\Delta P - \Delta \pi)}$$

where $\Delta V$ is the water volume of permeate during a certain filtration time ($\Delta t$, h), $\Delta P$ (bar) is the applied hydraulic pressure, and A is the effective filtration area. $C_f$ and $C_p$ are the solute concentrations of the feed and permeate solutions, respectively. B denotes the salt permeability coefficient, and $\Delta \pi$ is the osmotic pressure difference of a specific salt.

COMOSOL Simulations

2D MXene stacks were built as the water channels in the geometry builder and set as interior walls with the channel width at 15 nm and a layer number of 12. The creeping flow was chosen based on the dimensions of the channel. Effects of inlet applied pressure (bar), interlayer spacing (d-spacing, nm), and overlapping rate (gap length, nm) on the water flux through the channel was studied. To investigate the effect of pressure on the water flux, the upper inlet pressure was set at positions varying between 2 and 6 bar, and the bottom outlet pressure was fixed at the reference pressure. The d-spacing between the two neighboring layers was fixed at 0.8 nm. To examine the effect of d-spacing, the spacing between 0.2 and 1.5 nm was varied. The inlet pressure was fixed at 2 bar, and the gap between the channel wall and MXene sheet was fixed at 5 nm. For the overlapping rate (gap length), settings varied between 0 and 90% by changing the gap length between 1 and 14 nm. The steady-state flow velocity distribution was modeled using Navier-stokes equations. The velocity was averaged over the outlet length to estimate the water flux. Then the water flux was plotted against the varying parameters.

$$\nabla \cdot \vec{u} = 0$$

$$\rho \left( \frac{\partial \vec{u}}{\partial t} + (\vec{u} \cdot \nabla) \vec{u} \right) = -\nabla p + \mu \nabla^2 \vec{u} + \rho \vec{F}$$

where $\vec{u}$ is the velocity, ρ is water density, p is the pressure, and F is the external forces such as gravity.

Molecular Dynamics (MD) Simulations

The crystal structure of the MXene ($Ti_4C_3O_2$) nanosheets was taken from the literature. (Khazaei, 2013) The dimensions of a single nanosheet are 4.57, 1.83, and 0.95 nm (a, b, c), containing 1620 atoms. Three nanosheets were stacked in the simulation box with periodic boundaries (x, y, z). D spacing between the two layers was 1 nm. The MXene nanosheets were modeled in the Gromos force field (Schmid, 2011) using Lennard-Jones nonbonded parameters listed in Table 3.

TABLE 3

Lennard-Jones parameters for atom-atom interactions.
(Muckley, 2017; Bjørlo, 2018)

| | ε, kJ/mol (well depth) | σ, nm (van der Waals bond length) |
|---|---|---|
| Ti | 0.65 | 0.3166 |
| *Ti' | 0.65 | 0.3166 |
| C | 0.65 | 0.3166 |
| O | 0.65 | 0.35532 |

CNC was represented by three repeating units of cellulose containing 115 atoms. (Nishiyama, 2002) Two CNC chains were inserted between the MXene layers for the MXene/CNC simulation box. CNC, PIP, and Hexane molecules were all modeled using the same force field. SPC/E model was chosen for water solvent molecules. (Ding, 2018) The biphase system was constructed in a box (6.85 nm, 3.66 nm, 8.85 nm) containing 100 pip molecules, 3685 water molecules, and 338 hexane molecules in addition to three MXene nanosheets. In the control box with no Mxene, there were 5822 water molecules.

The van der Waals parameters V and W were calculated as follows:

$$\nabla \cdot \vec{u} = 0$$

$$\rho\left(\frac{\partial \vec{u}}{\partial t} + (\vec{u} \cdot \nabla)\vec{u}\right) = -\nabla p + \mu \nabla^2 \vec{u} + \rho \vec{F}$$

In a typical simulation carried out using the Groningen Machine for Chemical Simulations (GROMACS) 2021.03 package, the system energy was minimized to reach a maximum force under 1000 kJ/mol/nm. Then a 100 ps NVT simulation was performed (leapfrog algorithm with a time step of 2 fs), where a constant temperature of 300 K was maintained using a V-rescale thermostat. The MXene nanosheets were frozen in the simulation. The short-range interactions were evaluated using a neighbor list of 10 Å that was updated every 10 steps. A long-range analytical dispersion correction was applied to the energy and pressure to account for the truncation of these interactions. The last 90 ps of the NVT simulation were used to calculate the PIP diffusion coefficient with the Einstein relation, $$D = \lim_{t' \to \infty} \frac{\langle |r(t+t') - r(t)|^2 \rangle}{6t'}$$

where r is the displacement at time t, t' is the Δt.

Results and Discussion

Characterization of the MXene and CNC

FIG. 1A shows the TEM image of the delaminated MXene flake with a lateral size of several μm. The thickness of a monolayer MXene nanosheet was determined to be around 1-2 nm as characterized by AFM (FIG. 1A). The high-resolution transmission electron microscopy (HRTEM) image and the selected-area electron diffraction (SAED) pattern (inserted image in FIG. 1A) confirmed the high crystallinity of the MXene nanosheets without apparent defects. The SEM image in FIG. 1B shows that the CNC nanomaterial has a rod-like structure with a length of 100-200 nm and a diameter of 5-20 nm. As demonstrated in the XRD patterns (FIG. 1C), the shift of the diffraction peak (002) of MAX powder from 9.8° to a lower angle of 6.4° for MXene and the disappearance of the peak (104) of MAX powder further confirmed the selective removal of the Al layer, which is in line with results reported in (Gao, 2021). The XPS spectrum of MXene (FIG. 1D) revealed that the surface of the MXene flakes was mainly terminated with O and F groups. As for the CNC nanorods, the surface was primarily functionalized with O groups.

Characterization of the MXene/CNC Deposited Substrate

Figures 2A, 2B, 2C, 2D:
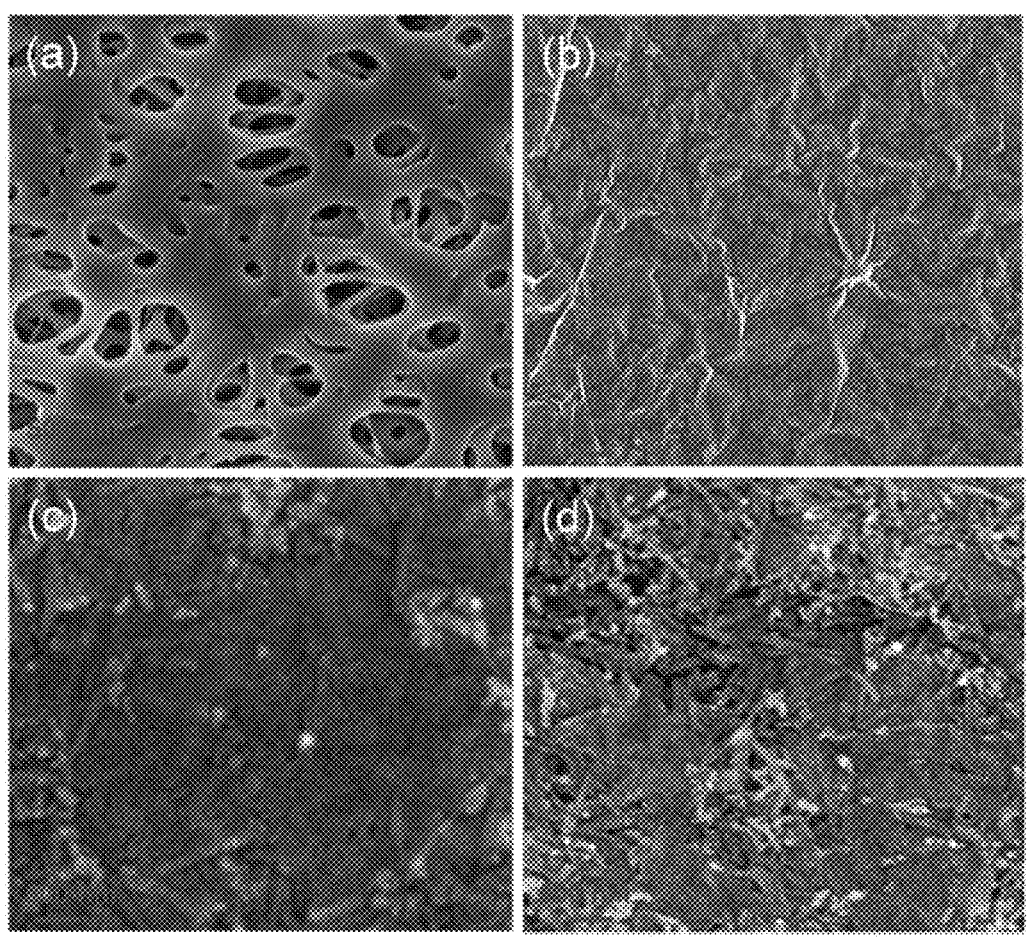
FIGS. 2A-2D show SEM images of pristine PES (FIG. 2A), MxC$_0$ (FIG. 2B), MxC$_{35}$ (FIG. 2C), and MxC$_{50}$ (FIG. 2D).
Figures 8A, 8B:
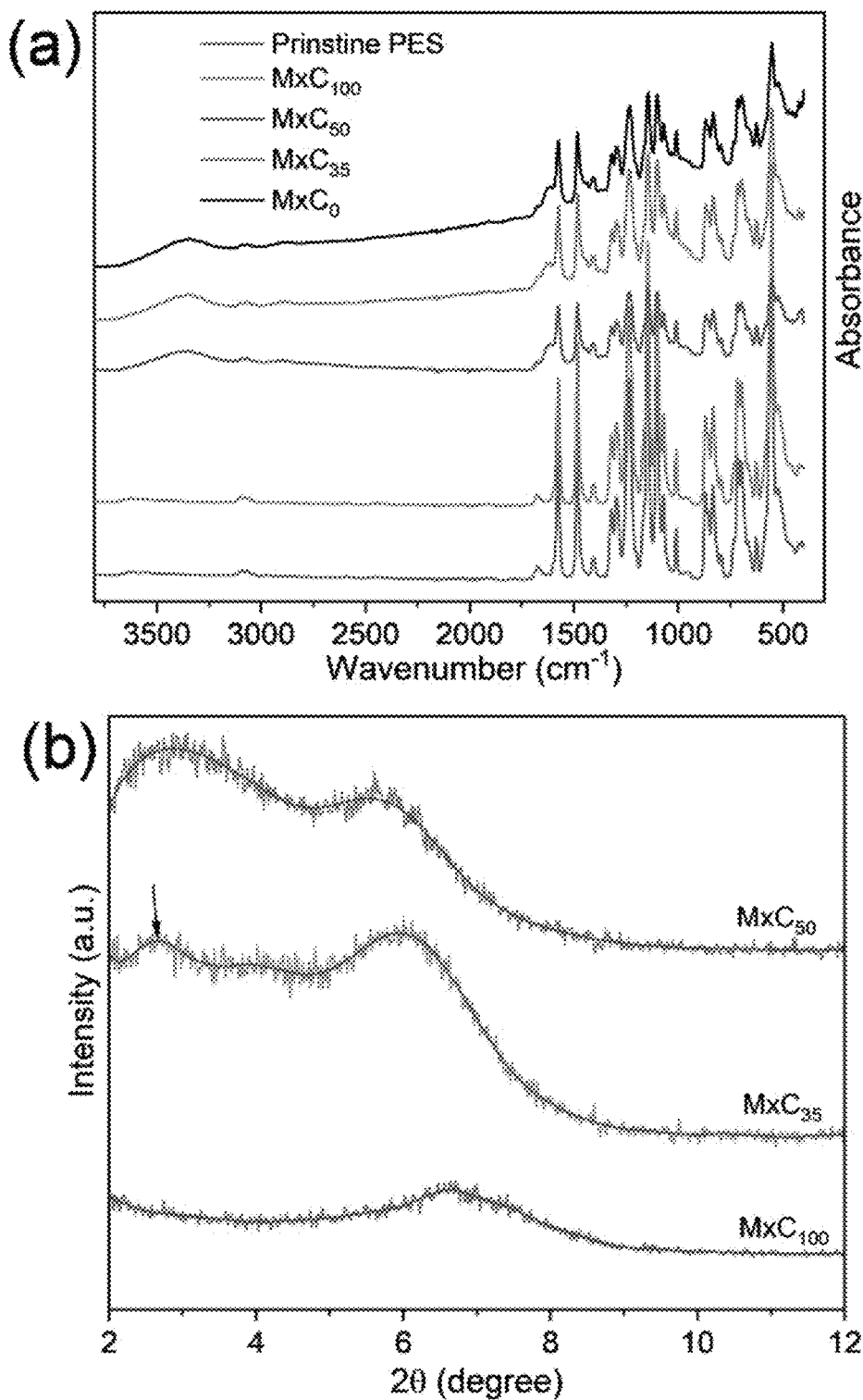
FIGS. 8A-8B show ATR-FTIR spectra of the substrate (FIG. 8A) and XRD patterns of the substrate (FIG. 8B).
Figures 9A, 9B:
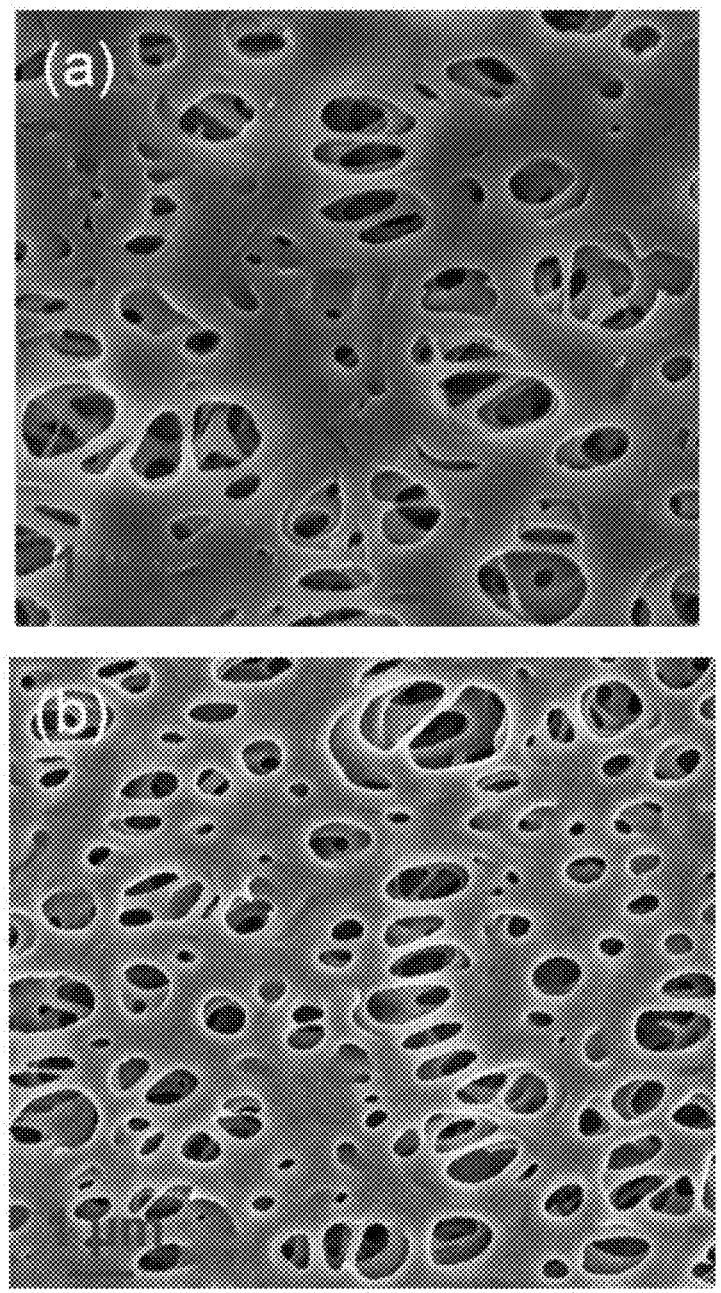
FIGS. 9A-9B show SEM images for surface morphologies of pristine PES substrate (FIG. 9A) and MxC$_{100}$ substrate (FIG. 9B).
Figures 10A, 10B, 10C, 10D, 10E:
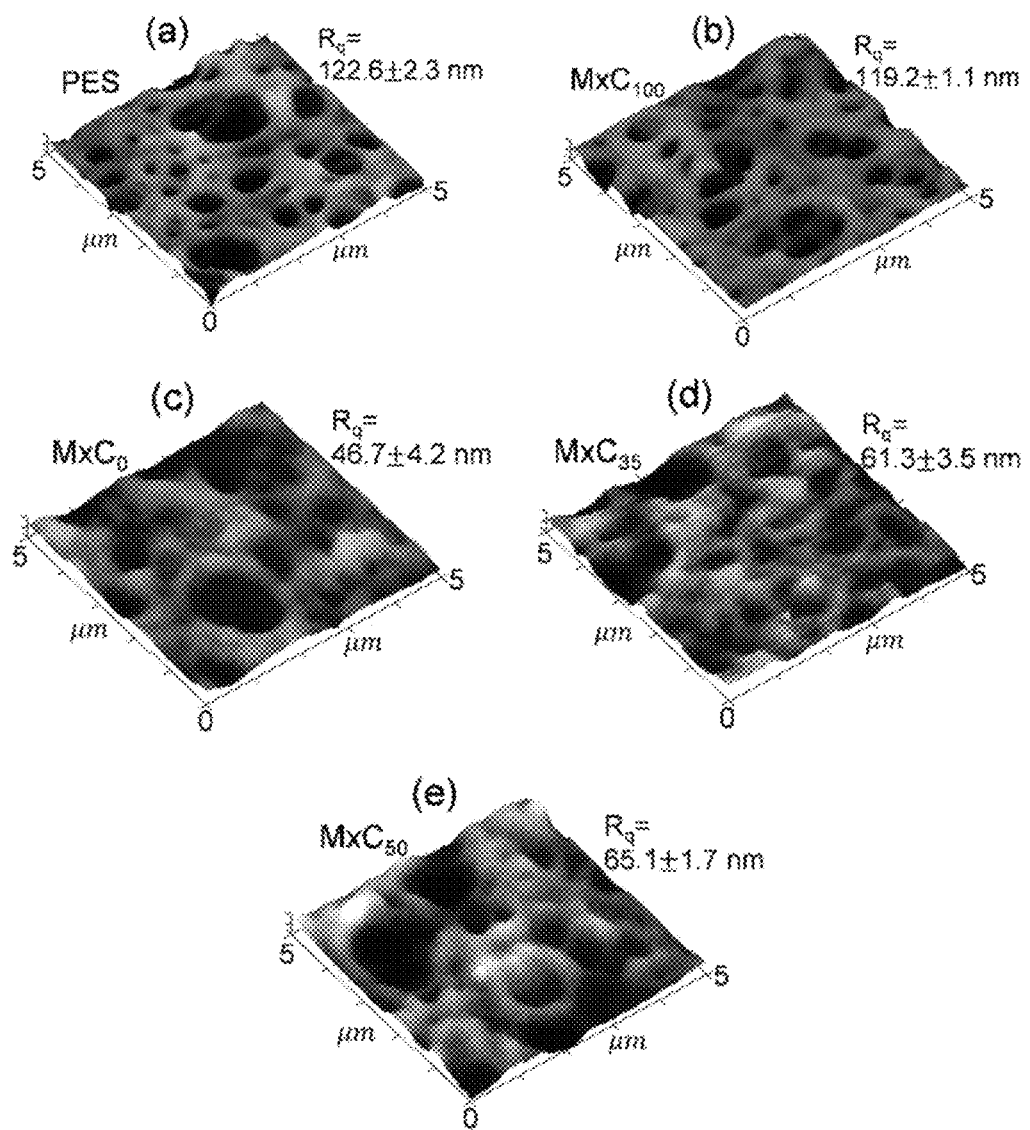
FIGS. 10A-10E show AFM images for the root mean square roughness of substrates comprising the following materials: PES (FIG. 10A), MxC$_{100}$ (FIG. 10B), MxC$_0$ (FIG. 10C), MxC$_{35}$ (FIG. 10D), MxC$_{50}$ (FIG. 10E).

The interfacial polymerization process could be greatly influenced by the structural and surface properties of the substrate, which were thoroughly characterized in this study. FIGS. 2A-2D present the SEM images of surface morphologies for different substrates. The PES substrate (FIG. 2A) with micron-sized pores and a rough surface (122.6±2.3 nm) were fully covered by the MXene/CNC coatings (FIGS. 2C, 2D). The disappearance of the characteristic peak at 1670 $cm^{-1}$ for the PES substrate and the emergence of the characteristic peak at 3340 $cm^{-1}$ reflecting the stretching vibrations of —OH also suggested the successful deposition of MXene/CNC onto the PES substrate (FIGS. 8A-8B). The pure MXene deposited substrate ($MxC_0$) exhibited the typical wrinkled surface structure as depicted in FIG. 2B, which is the intrinsic characteristic of the stacked 2D nanosheets. (Ding, 2017). As evidenced by the SEM and AFM images (FIGS. 9A-9B and 10A-10E), the PES substrate was unable to effectively retain CNC nanorods after filtrating the pure CNC solution (that is, $MxC_{100}$ substrate) likely because the membrane has a larger pore size (~0.2 μm) than the diameter of CNC nanorods (5-20 nm). The exact same FTIR spectrum of the $MxC_{100}$ as that of the nascent PES substrate confirmed the outflow of the CNC during the vacuum filtration (FIG. 8A-8B). Therefore, MXene can serve as a scaffold for sieving the CNC nanorods to form the MXene/CNC framework. As shown in FIG. 2C, the incorporation of a relatively low amount of CNC into MXene (for example, $MxC_{35}$) resulted in a continuously interconnected surface accompanied by a greater root mean surface roughness (RMS, 61.3±3.5 nm) compared to that of the $MxC_0$ (46.7±4.2 nm) (FIGS. 10A-10E), indicating the intercalation of CNC into MXene nanosheets. Meanwhile, excessive addition of CNC (for example, $MxC_{50}$) increased the unevenness, surface roughness (65.1±1.7 nm), and visible defects of the surface (FIG. 2D), which are unfavorable for the formation of a PA layer with high integrity. (Xue, 2022). In addition, the surface hydrophilicity and surface area of the substrate were increased with the intercalation of CNC (Table 4), which may contribute to the surface wetting and uptake of aqueous phase amine monomer.

TABLE 4

Surface properties of the MxC$_i$ substrate.

| Membrane | Contact angle (°) | Zeta potential (mV) | Surface area (μm$^2$) |
|---|---|---|---|
| MxC$_0$ | 55.2 ± 2.4 | −58.1 ± 4.93 | 24.1 ± 0.8 |
| MxC$_{35}$ | 38.6 ± 1.5 | −46.3 ± 6.02 | 27.3 ± 2.2 |
| MxC$_{50}$ | 27.7 ± 3.1 | −39.6 ± 5.31 | 28.5 ± 1.7 |

As seen in the XRD patterns of different substrates (FIGS. 8A-8B), the pure MXene membrane (MxC$_0$) showed a sharp peak around 6.5°, which was basically in agreement with the characteristic peak (002) of MXene nanosheets. With the incorporation of CNC nanorods, the interlay spacing of the MxC$_{35}$ increased to 5.9° compared to the pure MXene interlayer. Moreover, with the increased CNC content in the MXene/CNC hybrid framework, the intensity of the featured peaks of MXene became weaker, accompanied by the emergence of a new peak around 2.7° (FIGS. 8A-8B), which was likely attributable to the disruption of the long-range and directional stack of MXene layers after incorporating CNC. (Zhang, 2021) This phenomenon may provide additional evidence on the conjugation between MXene and CNC, which was in accordance with the changes in surface morphologies observed in the SEM and AFM images.

Characterization of the MXene/CNC Interlayered NF Membranes

Figures 3A, 3B, 3C, 3D, 3E, 3F, 3G, 3H:
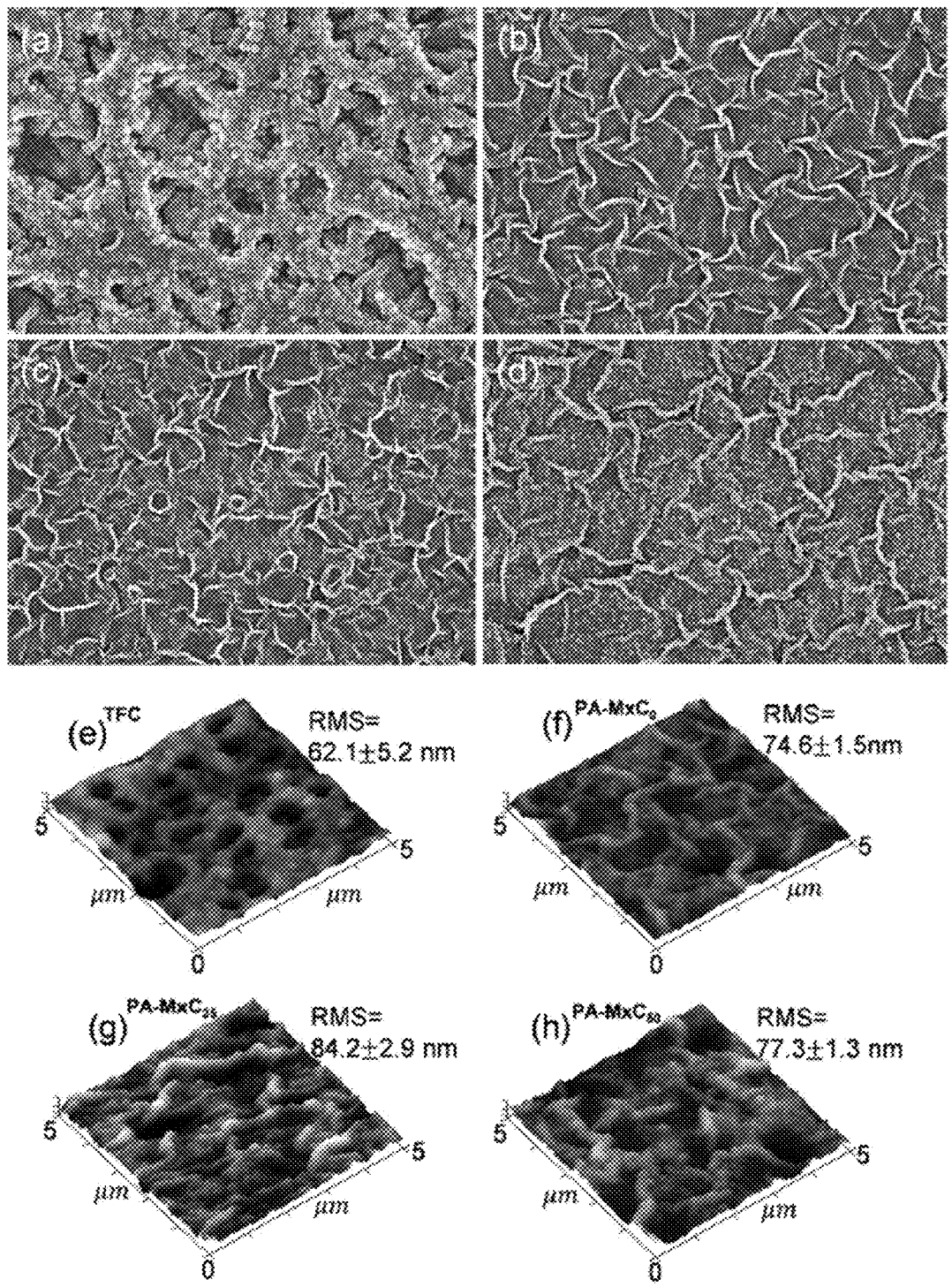
FIGS. 3A-3H show SEM surface morphologies of the membranes TFC (FIG. 3A), PA-MxC$_0$ (FIG. 3B), PA-MxC$_{35}$ (FIG. 3C), and PA-MxC$_{50}$ (FIG. 3D) and the AFM root-mean-square (RMS) roughness of the membranes TFC (FIG. 3E), PA-MxC$_0$ (FIG. 3F), PA-MxC$_{35}$ (FIG. 3G), and PA-MxC$_{50}$ (FIG. 3H).
Figures 11A, 11B:
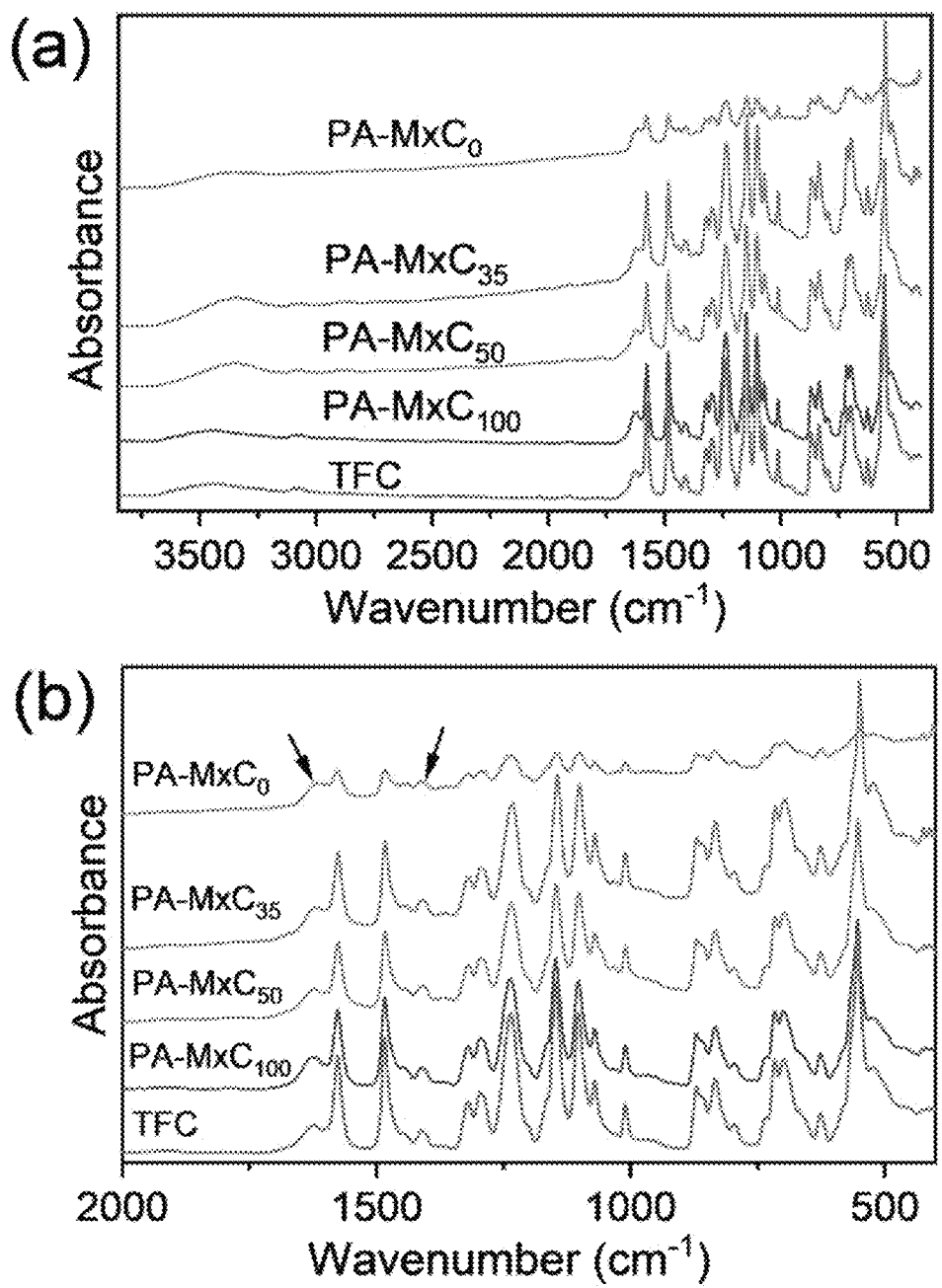
FIGS. 11A-11B show ATR-FTIR spectra of the PA-MxC$_i$ membrane.

ATR-FTIR spectra in FIGS. 11A-11B demonstrate that all the membranes possessed the featured absorption peak around 1627 cm$^{-1}$ corresponding to the C=O vibration of the amine group and peak around 1415 cm$^{-1}$ designed to the C—N bond, confirming the formation of the PA active layer on the substrate. (Wu, 2021; Liu, 2019; Zhang, 2016). Surface morphologies of the TFC and PA-MxC$_i$ membranes characterized by SEM and AFM were displayed in FIGS. 3A-3H. The PA active layer of the TFC membrane (FIG. 3A) exhibited the nodule structure, which is the typical prototype of a PA active layer formed through a conventional IP process involving PIP and TMC. (Tan, 2018). The corresponding AFM image showed a relatively smooth surface with a root-mean-square roughness (RMS) of 62.1±5.2 nm (FIG. 3E). The introduction of the MxC$_0$ interlayer triggered the formation of the stripped Turing structure (Tan, 2018) and the fading of the typical nodule structure (FIG. 3B). A combination of the stripped Turing and ring-shaped surface structures was observed for the PA layer formed on the MxC$_{35}$ substrate (FIG. 3C). The presence of a well-defined MxC$_{35}$ framework promoted the accumulation of PIP near the water/hexane interface, primarily involving in the formation of more initial polyamide nuclei above the substrate pore openings. The PIP molecules continuously diffused through the lateral interlayer space and diffused across the vertical channels, resulting in the ensuing formation of polyamide tufts, thereby yielding a net-like structure (visually as the stripped or close-looped Turing structure). (Tan, 2018; Zhao, 2014; Zhu, 2017; Ghosh, 2009). The recurrence of the commonly spotted protuberance (that is, the nodular structure) was observed for the PA active layer formed on the deposited substrate with a higher content of CNC (that is, PA-MxC$_{50}$). As evidenced by the SEM and XRD characterization, the interlayer spacing was largely increased, and the interconnected MXene/CNC framework was disrupted due to the excessive CNC addition, resulting in the uncontrollable release of PIP monomers. In addition, the greatly enhanced hydrophilicity of the MxC$_{50}$ substrate might hinder the diffusion of PIP molecules to the interface due to the hydrogen bonds between the hydrophilic sites with the PIP molecules, which likely formed the smaller polyamide nuclei, and eventually evolved into the discrete spotted nodules. (Zhu, 2017; Jimenez, 2012). The emergence of the textured structure, especially for the PA-MxC$_{35}$ membrane, resulted in a rougher surface (84.2±2.9 nm) and a 16.6% increase in surface area compared to TFC (Table 5), offering an enlarged effective filtration area for water permeation. (Tan, 2018; Xue, 2022; Wang, 2018; Jiang, 2019).

TABLE 5

Physiochemical properties of the PA-MxC$_i$ membrane.

| Membrane | MWCO (Da) | μ$_p$ (nm) | σ$_p$ | Zeta potential (mV, pH~6) | Surface area (μm$^2$) |
|---|---|---|---|---|---|
| PA-MxC$_0$ | 336 | 0.38 | 1.132 | −37.5 ± 1.34 | 34.2 ± 1.1 |
| PA-MxC$_{35}$ | 261 | 0.33 | 1.016 | −26.3 ± 2.45 | 36.8 ± 1.3 |
| PA-MxC$_{50}$ | 284 | 0.35 | 1.051 | −33.7 ± 2.19 | 33.5 ± 0.5 |
| TFC | 307 | 0.36 | 1.084 | −42.1 ± 3.06 | 30.7 ± 1.6 |

The cross-linking degree of the membranes was calculated based on the O:N ratio from the XPS results. The cross-linking degree (CD) of the PA network was determined using an elemental ratio of oxygen/nitrogen (O/N), as reported in the previous study. (Mohammad, 2015) The PA network consists of two portions: a cross-linked portion (m) where all three acyl chlorides in the TMC molecule reacted with the amine groups of the aqueous phase monomers (i.e., PIP), and a linear portion (n) where only two of the three acyl chlorides reacted with the amine groups. The O:N ratio is 3:3 and 4:2 in the cross-linked portion (m) and the linear portion (n), respectively. Thus, the cross-linking degree was calculated as follows:

$$\frac{O}{N} = \frac{4n + 3m}{2n + 3m}$$

$$CD(\%) = \frac{m}{m + n} \times 100\%$$

where the O:N ratio was obtained from XPS measurement.

The PA-MxC$_{35}$ membrane has the lowest O:N ratio, leading to the highest cross-linking degree of 89.10% (Table 6).

TABLE 6

The XPS elemental data and the cross-linking degree (CD) of the PA-MxC$_i$ membrane.

| Membrane | C (%) | O (%) | N (%) | CD (%) |
|---|---|---|---|---|
| TFC | 71.69 | 15.18 | 13.13 | 78.33 |
| PA-MxC$_0$ | 75.63 | 13.21 | 11.16 | 74.64 |
| PA-MxC$_{35}$ | 71.96 | 14.53 | 13.51 | 89.10 |
| PA-MxC$_{50}$ | 73.91 | 13.82 | 12.27 | 81.85 |

As indicated by the water contact angle listed in Table 4, the hydrophilicity of the MXene/CNC deposited substrate was largely increased compared to that of the MxC$_0$ substrate, which is beneficial for the uptake of the aqueous solution of amine monomers.[55] In this respect, the highly cross-linked PA network can be partially explained by the enhanced PIP uptake by the MxC$_{35}$ substrate, which may lead to a relatively high concentration of PIP along the water/hexane interface. For membranes with pure MXene as the interlayer (PA-MxC$_0$), the lower surface hydrophilicity of the MXene compared to the MXene/CNC layer may result in poor wetting of the aqueous solution and less PIP uptake. Consistent with the cross-linking degree calculation, the pore size analysis (Table 5) based on the rejection of small neutral solutes (Table 7) demonstrated that the PA-MxC$_{35}$ membrane exhibited a smaller effective pore size than other membranes.

TABLE 7

The calculated Stokes radii of neutral organic compounds.

|  | Glycerol (92 Da) | Glucose (180 Da) | PEG (300 Da) | PEG 400 (Da) | PEG (600 Da) |
| --- | --- | --- | --- | --- | --- |
| Stokes radius (nm) | 0.262 | 0.358 | 0.401 | 0.471 | 0.590 |

As size exclusion plays a critical role in solute rejection, the reduction in pore size of the PA-MxC$_{35}$ is desirable for achieving high rejection.

The pore size of a membrane was characterized by the retention towards a series of neutral organic compounds with varied molecular weights (MW). The mean pore size of a membrane is equivalent to the Stokes radius of the neutral organic solute with a measured rejection rate of 50%. The molecular weight cutoff (MWCO) of a membrane was defined as the MW of which the rejection rate equals 90%. The Stokes radii of neutral organic molecules ($r_p$) are correlated with their molecular weight (MW).

For small organic solutes, i.e., glycerol (92 Da), and glucose (180 Da) (Chen, 2015):

$$\log r_p = -1.4962 + 0.4654 \log(MW)$$

For PEGs (MW of 300, 400, and 600 Da) (Chen, 2015):

$$r_p = 16.73 \times (MW)^{0.557} \times 10^{-3}$$

Based on the above equations, the Stokes radii of glycerol, xylose, and PEGs with varied MW were calculated and listed in Table 6.

The pore size distribution curve of a membrane was expressed as a probability density function (PDF) using a log-normal model (Chen, 2015):

$$\frac{dR(r_p)}{dr_p} = \frac{1}{r_p \ln \sigma_p \sqrt{2\pi}} \exp\left(-\frac{(\ln r_p - \ln F)^2}{2(\ln \sigma_p)^2}\right)$$

Where $\sigma_p$ is the geometric standard deviation, and r is the mean pore size of a membrane.

Separation Performance of the PC-MxC$_i$ Membrane

Figures 4A, 4B, 4C, 4D:
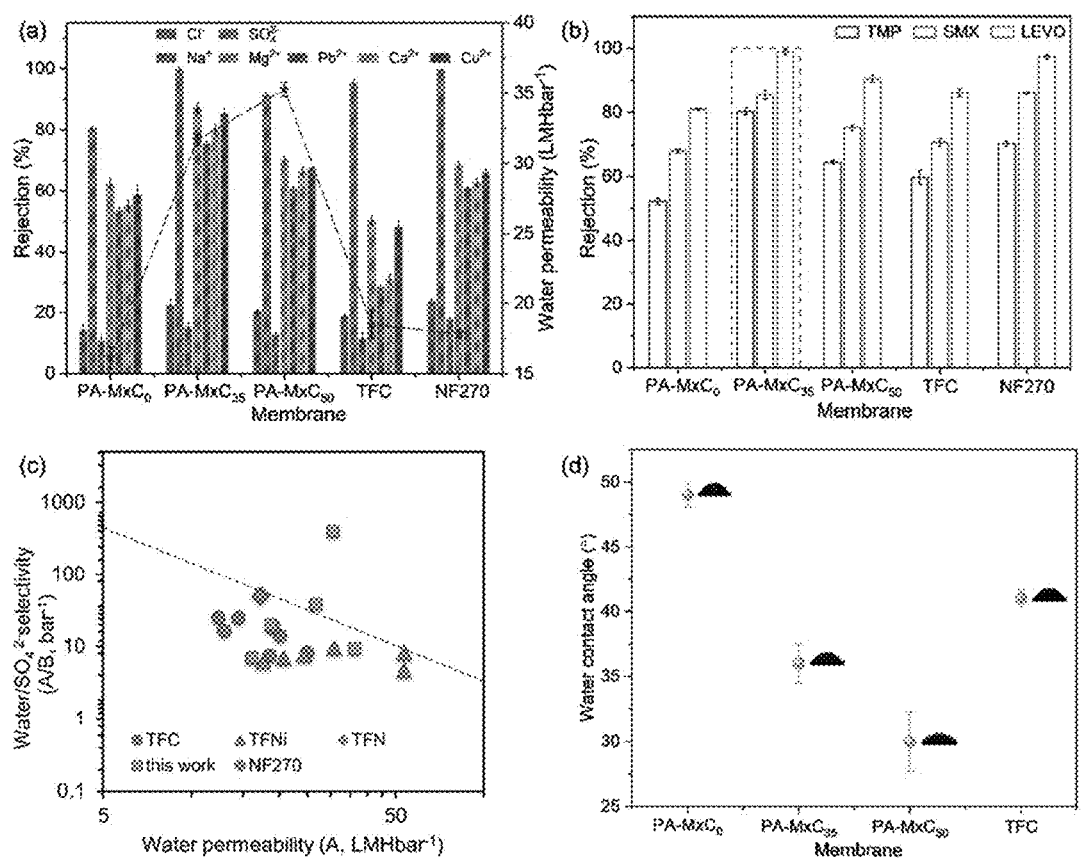
FIGS. 4A-4D show salt rejection of the membrane (FIG. 4A), performance comparisons among commercial NF 270 membrane, TFC/TFN/TFN$_i$ membranes reported in the literature (Ji, 2021; Gao, 2022), and the exemplary PA-MxC$_i$ membranes, the gray dashed line represents the upper-bound of the TFC-PA membrane permeability-selectivity (FIG. 4B), antibiotics removal of the membrane (FIG. 4C), and contact angle of the PA-MxC$_i$ membranes (FIG. 4D).

FIGS. 4A-4D demonstrate the separation performance of each as-prepared NF membrane. Water permeability of the PA-MxC$_{35}$ (31.68 LMH bar$^{-1}$) and PA-MxC$_{50}$ (35.27 LMH bar$^{-1}$) membranes was substantially higher than the PA-MxC$_0$ membrane (16.13 LMH bar$^{-1}$) and the conventional TFC membrane (17.81 LMH bar$^{-1}$) as illustrated in FIG. 4A. The results suggested that an interlayer formed by well-stacked 2D materials (for example, MXene) with highly tortuous water channels (Ritt, 2019) tended to be less effective in enhancing the water permeability of the interlayer-regulated PA-based NF membrane. By intercalating the hydrophilic rodlike CNC into MXene, the stacking of MXene layers was disrupted, which significantly facilitated water transport. As characterized by AFM, the introduction of the interlayer (for example, MxC$_{35}$ and MxC$_{50}$) resulted in the formation of the PA layer with a rougher surface, which potentially increased the surface area (Table 5) and thereby enhanced the water permeability. Additionally, in comparison to the PA-MxC$_0$ membrane and TFC membrane, the surface hydrophilicity of the PA-MxC$_{35}$ and PA-MxC$_{50}$ membrane was increased by more than 20% (FIG. 4D), which positively contributed to the enhancement of water permeability. Moreover, the water permeability of the conventional TFC membrane was also limited by the higher hydraulic resistance induced by the funnel effect, which resulted in much longer water transport in the transverse direction when permeating through the PA active layer. (Wijmans, 2015; Ramon, 2012; Kattula, 2015)

The introduction of the highly permeable MXene/CNC interlayer serving as the gutter layer facilitated water transport in the transverse direction, thereby shortening the transport distance within the active layer, which significantly minimized the hydraulic resistance across the active layer and promoted water permeability. (Yang, Mechanistic Insights, 2020; Long, 2022; Zhu, 2020)

Figure 12:
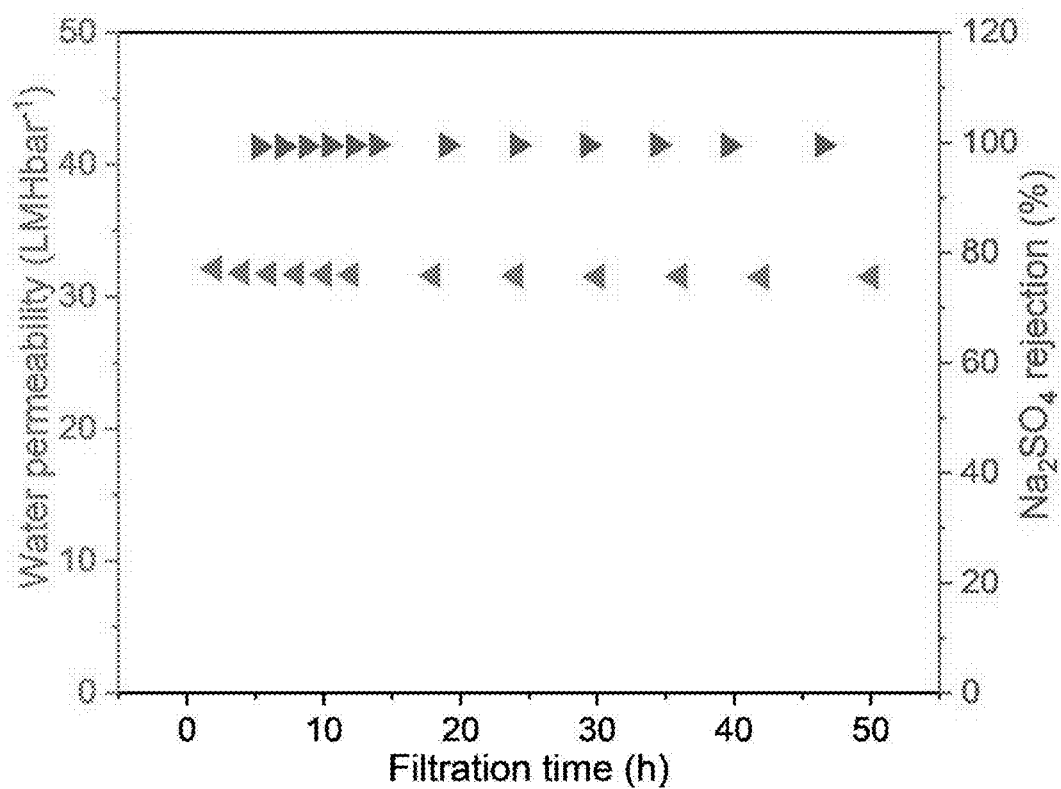
FIG. 12 shows the long-term stability of the PA-MxC$_{35}$ membrane. The hydraulic pressure of 4 bar was applied to all tests. The Na$_2$SO$_4$ solution of 1.9 g L$^{-1}$ was used for a salt rejection test.

As shown in FIGS. 4A-4D, the PA-MxC$_{35}$ exhibited greater rejection of both salt ions (SO$^{2-}$, Ca$^{2+}$, and Mg$^{2+}$) and heavy characteristics. The PA-MxC$_{35}$ membrane demonstrated consistently improved rejection of all three compounds' metal ions (Pb$^{2+}$ and Cu2+) than that of the TFC membrane (more than 80% retention to all three targeted antibiotics). The PA-MxC$_{35}$ membrane had a 99.51% Na$_2$SO$_4$ rejection, which was comparable to that of the commercial NF270 membrane (99.73%). This remarkable enhancement can be primarily attributed to its smaller effective mean pore size (µp~0.33 nm) and compact pore distribution (as reflected by the geometric standard deviation $\sigma_p$ listed in Table 5). The improved surface hydrophilicity of the MxC$_i$-coated substrate made it possible to uptake more PIP monomers from the aqueous phase on the substrate surface, not just in the inner pores. (Zhang, 2016; Jimenez, 2012; Yang, 2017) Therefore, the increased PIP concentration on the substrate surface, accompanied by the controlled release of PIP molecules from the nanochannels of the MXene/CNC interlayer, resulted in a controllable reaction with the TMC monomer, leading to the formation of a PA network with a relatively uniform pore size distribution. (Xue, 2022; Yang, 2018; Yang, 2019) For the PA-MxC$_{35}$ membrane, fewer —COOH groups were left on the highly cross-linked PA network, leading to a relatively weaker negative surface charge than that of the TFC membrane (Table 5). (Gong, 2019) As the surface charge of the membrane has a great impact on the Donnan exclusion for ion rejection, the less negative surface of the MxC$_{35}$ membrane promoted the rejection against cations. FIG. 4C presents a comparison of the separation performance of membranes fabricated in this work to three major types of PA-based NF membranes (that is, conventional TFC NF, thin film nanocomposite NF, and interlayer-regulated PA-based NF) reported in previous work as well as the commercial NF membrane (that is, NF 270) tested in this work. The trade-off between the water permeability and the water/Na$_2$SO$_4$ selectivity formed the upper-bound relationship and served as the reference index (FIG. 4C). The PA-MxC$_{35}$ membrane exhibited an upper-bound breaking performance with exceptional water permeability without compromising the Na$_2$SO$_4$ retention capacity. Moreover, after 50 h filtration, no apparent changes to water permeability and Na$_2$SO$_4$ rejection were observed for the PA-MxC$_{35}$ (FIG. 12), suggesting that the membrane was able to remain stable and integral under long-term operation. (Yang, 2022)

Figure 13:
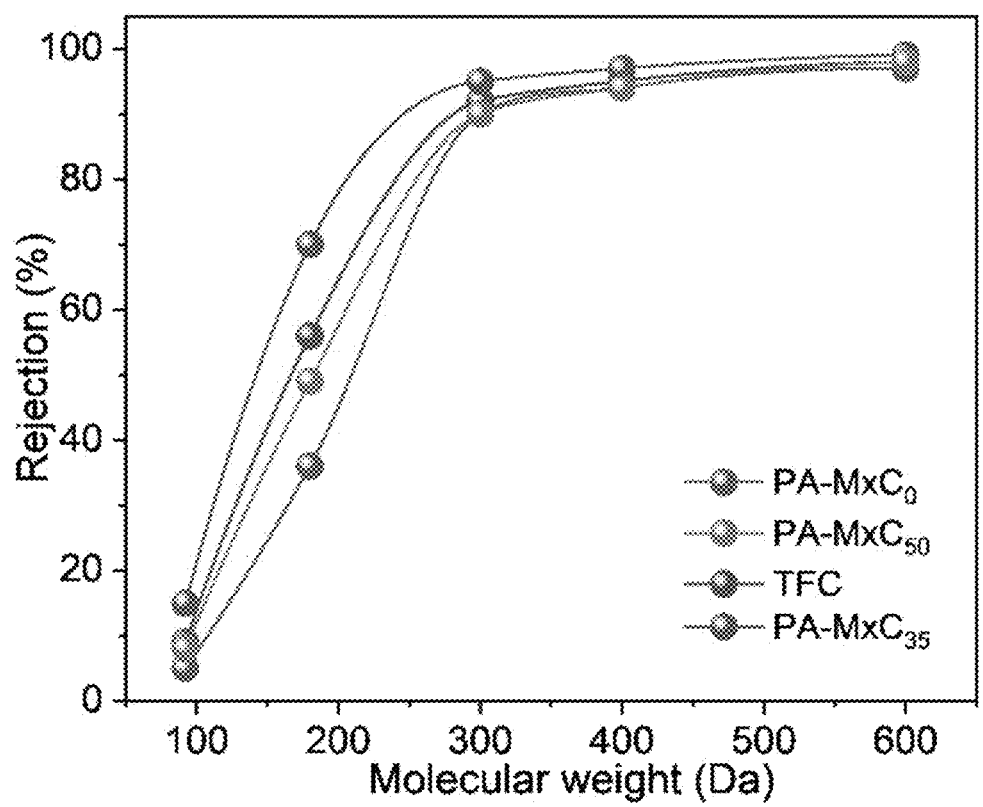
FIG. 13 shows a membrane rejection towards small neutral molecules with different molecular weights.

In addition to the water permeability and salt rejection performance, the as-prepared PA-MxC$_i$ membranes were further examined for their removal efficiency against three antibiotics (that is, SMX, LEVO, and TMP) with different compared to the TFC membrane. The rejection of LEVO was up to 98.5%, which was even higher than the rejection of 97.3% achieved by the commercial NF270. The excellent retention performance primarily relied on the size exclusion, owing to the decreased MWCO (~261 Da) (FIG. 13) and compressed pore size distribution of the PA-MxC$_{35}$ membrane (Table 5). In addition, despite the larger molecular weight of TMP over SMX, a lower rejection of TMP (80.2%) than that of SMX (85.5%) was achieved by the PA-MxC$_{35}$ membrane. This result was attributable to the role of the membrane surface charge, comprising the rejection of TMP through attractive interaction between the negative surface and the strong positive charge carrying on the TMP molecule at working conditions (pH~6).

Mechanistic Investigation on the Role of MXene/CNC Interlayer

As discussed in the separation performance section, the substantial enhancement of water permeability is attributable to the inclusion of the highly permeable MXene/CNC layer, which provided a shorter water transport pathway through the PA layer. Due to the high permeability of the interlayer (that is, the MXene/CNC layer in this work), water was channeled into the substrate pores through the gutter effect, thereby shortening the water transport pathway through the PA layer. (Kattula, 2015)

Figures 5A, 5B:
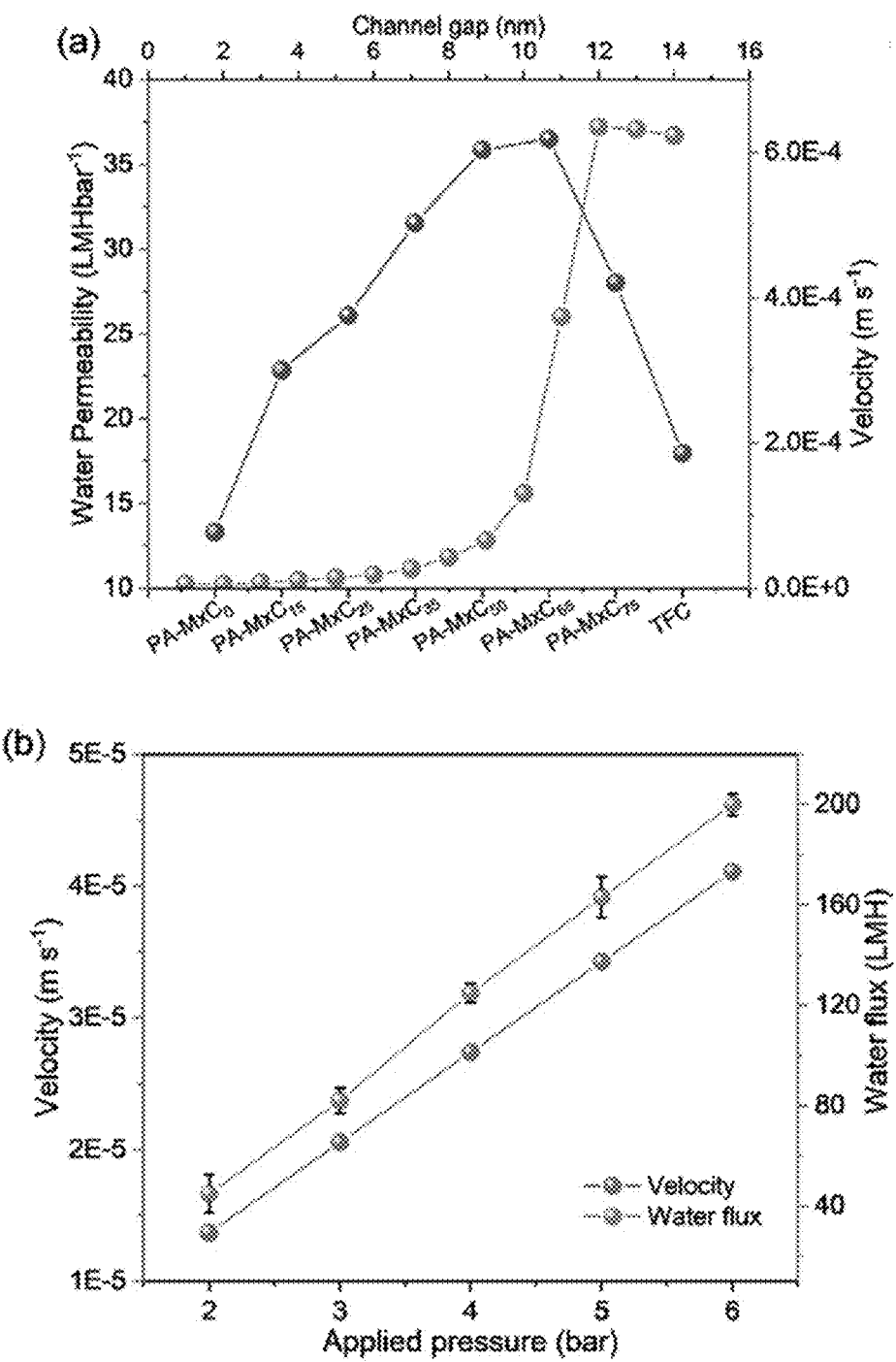
FIGS. 5A-5B show the gutter effect of the MXene/CNC interlayer on water permeability (FIG. 5A) and water flux as a function of applied pressure (FIG. 5B).
Figure 14:
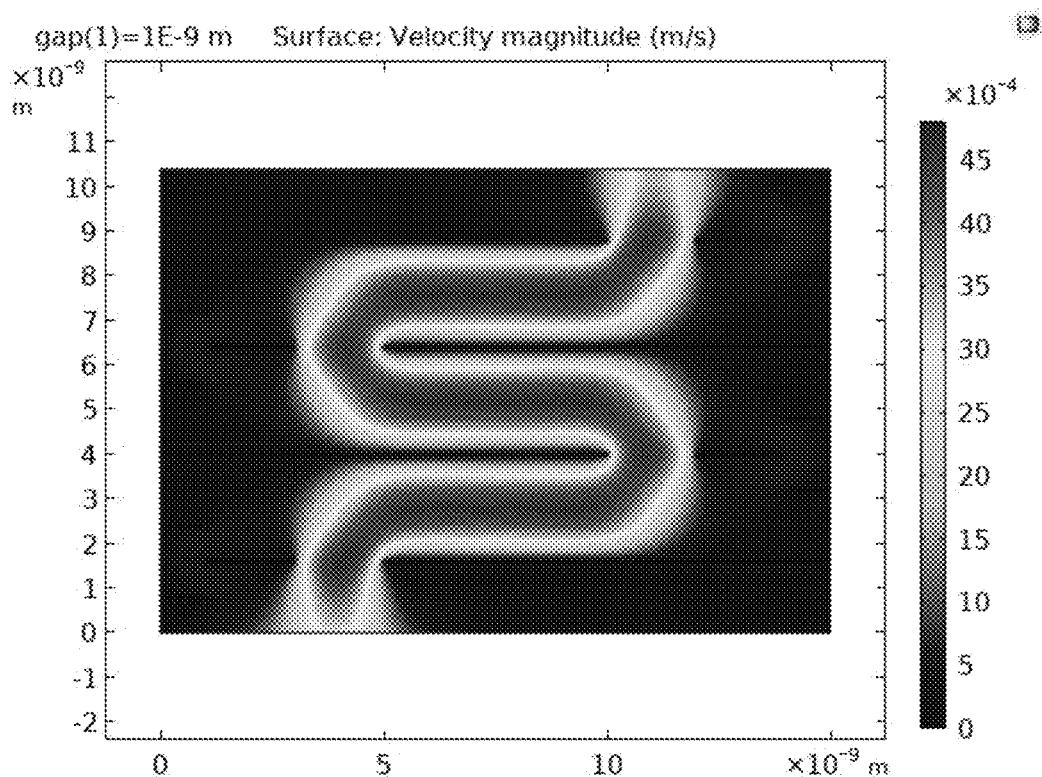
FIG. 14 shows simulated water transport in COMSOL simulation.
Figures 15A, 15B:
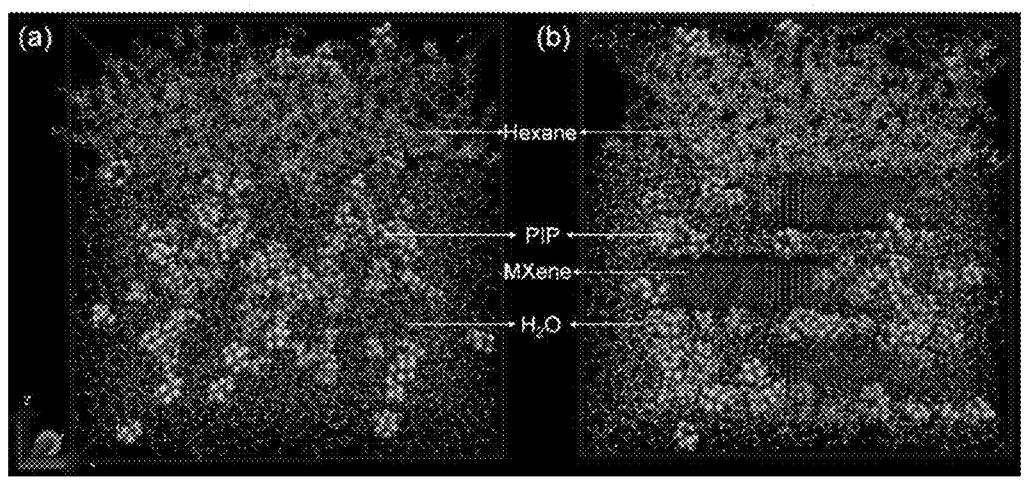
FIG. 15A-15B shows a schematic MD simulation of a bulk water system (FIG. 15A), and a system with pure MXene as interlayer (FIG. 15B).

To explore the gutter effect of the MXene/CNC interlayer, the water transport model was executed in the COMSOL Multiphysics program to simulate the water transport profile as characterized by the water flow velocity (FIGS. 5A, 5B, 14). The output values showed a similar trend as the experimental results of water permeability. There was an increasing trend in simulated water transport starting from a channel gap of 6 nm as the overlapping rate between two adjacent MXene nanosheets reached zero at a channel gap of 6 nm. In contrast, further improvement was constrained with the channel gap larger than 12 nm. As confirmed by the XRD patterns of the MxC$_i$ substrate (FIGS. 8A-8B), the intercalation of CNC into the MXene disrupted the directional stacking of MXene layers, which potentially lowered the overlapping rate, and in turn gave rise to a more permeable gutter layer. The results herein put forward compelling evidence that the limitation from the pure MXene interlayer can be greatly alleviated by intercalating the hydrophilic CNC nanorods into the MXene stack.

Additionally, the pressure resistance of the PA-MxC$_{35}$ was examined, as shown in FIG. 5B. Water permeability of the PA-MxC$_{35}$ membrane showed an approximately linear relationship with the operating pressure ranging from 2 to 6 bar. The water transport by applying varied hydraulic pressure was simulated in COMSOL. The relationship of the simulated results showed good agreement with the experimental results. The MXene/CNC interlayer potentially enhanced the mechanical properties and stability of the membrane, enabling excellent water permeabilities under a wide range of operational pressures.

Figures 6A, 6B:
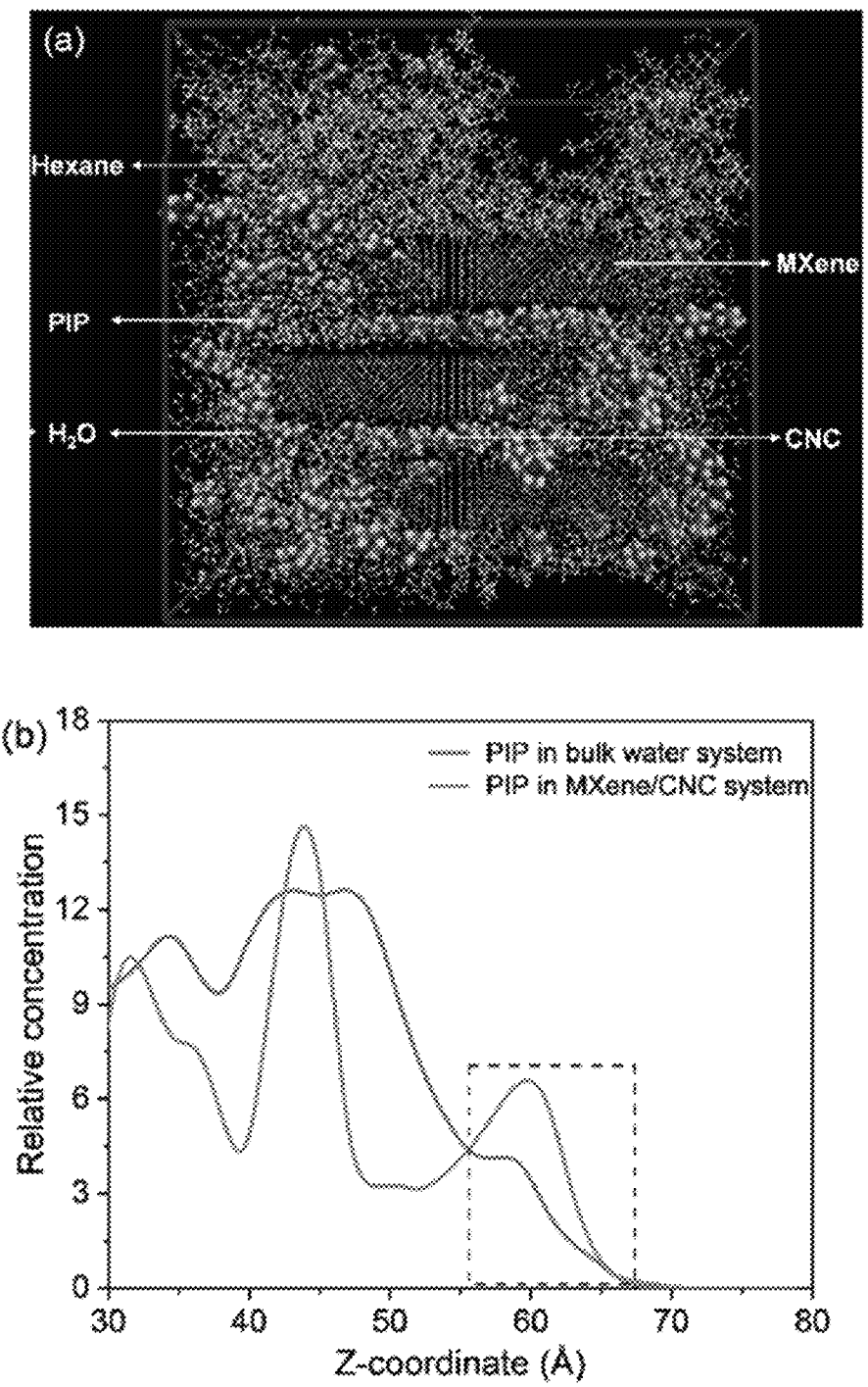
FIGS. 6A-6B show schematics of MD simulation for a water/hexane interface in the MXene/CNC composite system (FIG. 6A) and the relative abundance of PIP across the water/hexane interface (FIG. 6B).
Figure 7:
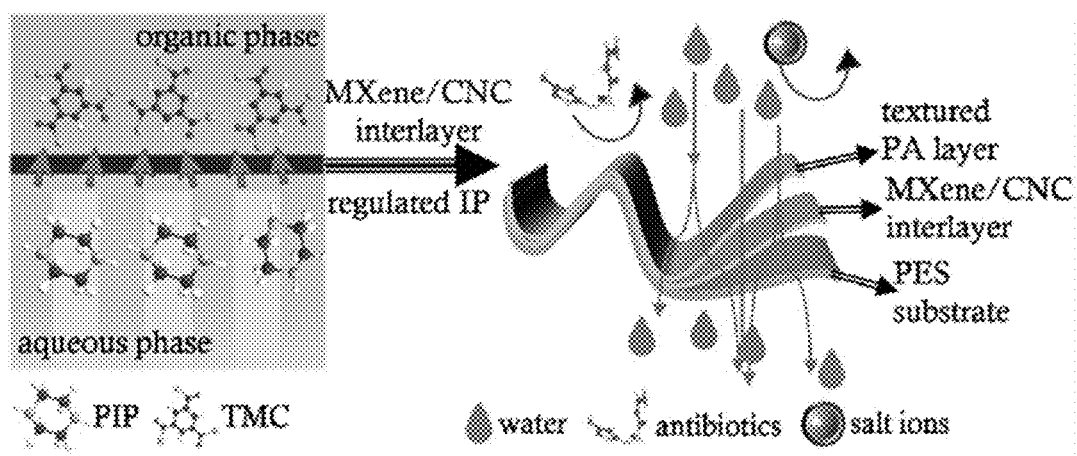
FIG. 7 shows an example membrane comprising a polymer layer, interlayer, and a substrate.

The formation of a PA layer through IP reaction typically involves the aqueous phase monomer (that is, PIP in this study) diffusing across the water-hexane interface to react with the organic phase monomer (that is, TMC in this study). Hence, the predominant limiting factor for IP reaction is the diffusion rate of PIP. The conclusion of the interlayer potentially accelerated the diffusion of PIP and, in turn, regulated the IP reaction. To support this hypothesis, MD simulation was performed to analyze the population of PIP molecules with and without the MXene/CNC interlayer (FIGS. 6A-6B, 15A-15B). The relative concentrations of PIP molecules are shown in FIG. 6B. A locally concentrated population of PIP molecules was observed at the water/hexane interface in the MXene/CNC system. This result indicated that the introduction of the MXene/CNC interlayer promoted the accumulation of PIP molecules near the water/hexane interface, which created a larger initial gradient of PIP for interface transportation, resulting in the formation of a more cross-linked PA network. (Liang, 2020) Additionally, due to the smaller pores of the interlayer compared to the porous PES substrate, the presence of the MXene/CNC interlayer provided steric hindrance against the reverse diffusion of newly formed PA to the aqueous phase, which reduced the hydrolysis of PA and thereby increased the degree of cross-linking. (Gong, 2019; Liang, 2020) Therefore, the PIP accumulation, together with the suppression of undesirable hydrolysis, synergistically contributed to a higher degree of cross-linking and smaller pore size of the MXene/CNC interlayered NF membrane.

Discussion

Global water scarcity is one of the foremost challenges of today. To address the global water shortage issue, water purification techniques have been increasingly demanded to produce safe and clean water from unconventional water resources such as wastewater, brackish water, and seawater. (Lin, 2021). Membrane-based processes, especially nanofiltration (NF), have been of great interest in water purification and reuse, ascribing to its superior energy efficiency and better water quality compared with conventional water treatment processes. (Hilal, 2004; Mohammed, 2015; Gu, 2013; Han, 2013; Xu, 2020; Sarkar, 2021; Guo, 2021). Typically, modern NF membranes are fabricated through interfacial polymerization (IP) involving amine monomer in the aqueous phase and acyl chloride in the organic phase to form a selective polyamide (PA) layer on a porous substrate. The structural and surface chemical properties play dominant roles in the performance of PA-based thin film composite (TFC) NF membranes. Although TFC NF membranes have been widely applied in water treatment, the conventional TFC NF membranes still suffer from low separation selectivity and intrinsic permeability-selectivity trade-off. (Geise, 2011; Park, 2017).

Over the past decade, extensive efforts have been devoted to the design of thin film nanocomposite (TFN) membranes with the incorporation of nanomaterials into the PA matrix. (Liau, 2021) A wide range of nanomaterials from zero-dimensional (0D) to two-dimensional (2D), such as quantum dots, titanium oxide (TiO$_2$) nanoparticles, carbon nanotubes (CNTs), metal-organic-framework (MOF), and graphene oxide (GO), have been broadly used to fabricate TFN membranes for applications in water treatment and molecular separation. (Bi, 2018; Zarrabi, 2016; Zhu, 2017; Dong, 2016; Lai, 2016; Rajaeian, 2013; Zhang, 2020). The majority of these TFN membranes have exhibited increased water permeability. Nevertheless, overcoming the well-documented permeability-selectivity trade-off has been rare, with many cases even suffering from compromised perm-selectivity due to the impaired integrity of the PA active layer induced by the aggregation of nanomaterials.

In recent years, growing research interest has been seen in tailoring the formation of a PA layer to achieve better separation performance by including an interlayer between the porous substrate and the active layer. (Yang, A critical review on thin-film nanocomposite membranes, 2020; Ji, 2021). A series of interlayers, from 2D materials (for example, MOF and GO) to other common coating materials (for example, polydopamine and polyphenol), have been utilized for preparing interlayered TFN membranes ($TFN_i$). (Choi, 2019; Gao, 2019; Li, 2015; Sun, 2021; Yang, Mechanistic Insights, 2020; Yang, 2021; Karan, 27; Sun, 2020). By introducing such an interlayer, the formation of a PA network could be regulated by controlling the diffusion of the amine monomer and the reaction rate of the IP process. Moreover, water transport can be greatly facilitated attributed to the shortened transport distance due to the so-called gutter effect of the interlayer (Yang, A critical review on thin-film nanocomposite membranes, 2020), which has been well established for gas separation. (Kattula, 2015; Liang, 2019). However, this effect has not been well simulated in the context of water transport through a separation membrane. Compared to 1D nanomaterials (for example, carbon nano-tube, CNT) and interfacial coatings (for example, PDA), the 2D nanosheets with fast water transport channels and hydrophilic surfaces have shown promise to be a good candidate as the interlayer. (Wu, 2020). Nevertheless, the well-stacked water channels formed by 2D materials with large aspect ratios have been reported to cause high mass transfer resistance owing to the tortuous water channels. (Ritt, 2019). Additionally, the existing efforts on interlayer-regulated NF membranes have been primarily centered on achieving high salt rejection for brackish water desalination. While for applications such as resource recovery and potable water reuse, the removal of heavy metals and emerging contaminants (for example, antibiotics) can be far more important. (Khanzada, 2020; Tang, 2018).

Other advantages which are obvious, and which are inherent to the invention, will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The following patents, applications and publications as listed below and throughout this document are hereby incorporated by reference in their entirety herein.

REFERENCES

Lin, S.; Hatzell, M.; Liu, R.; Wells, G.; Xie, X. Mining resources from water. *Resources, Conservation and Recycling* 2021, 175, 105853.

Hilal, N.; Al-Zoubi, H.; Darwish, N. A.; Mohamma, A. W.; Abu Arabi, M. A comprehensive review of nanofiltration membranes:—Treatment, pretreatment, modelling, and atomic force microscopy. *Desalination* 2004, 170 (3), 281-308.

Mohammad, A. W.; Teow, Y. H.; Ang, W. L.; Chung, Y. T.; Oatley-Radcliffe, D. L.; Hilal, N. Nanofiltration membranes review: Recent advances and future prospects. *Desalination* 2015, 356, 226-254.

Gu, J.-E.; Lee, S.; Stafford, C. M.; Lee, J. S.; Choi, W.; Kim, B.-Y.; Baek, K.-Y.; Chan, E. P.; Chung, J. Y.; Bang, J.; Lee, J.-H. Molecular Layer-by-Layer Assembled Thin-Film Composite Membranes for Water Desalination. *Adv. Mater.* 2013, 25 (34), 4778-4782.

Han, Y.; Xu, Z.; Gao, C. Ultrathin graphene nanofiltration membrane for water purification. *Adv. Funct. Mater.* 2013, 23 (29), 3693-3700.

Xu, R.; Qin, W.; Zhang, B.; Wang, X.; Li, T.; Zhang, Y.; Wen, X. Nanofiltration in pilot scale for wastewater reclamation: Long-term performance and membrane biofouling characteristics. *Chemical Engineering Journal* 2020, 395, 125087.

Sarkar, P.; Modak, S.; Karan, S. Ultraselective and highly permeable polyamide nanofilms for ionic and molecular nano-filtration. *Adv. Funct. Mater.* 2021, 31 (3), 2007054.

Guo, H.; Li, X.; Yang, W.; Yao, Z.; Mei, Y.; Peng, L. E.; Yang, Z.; Shao, S.; Tang, C. Y. Nanofiltration for drinking water treatment: a review. *Front. Chem. Sci. Eng.* 2021, 16, 681-698.

Geise, G. M.; Park, H. B.; Sagle, A. C.; Freeman, B. D.; McGrath, J. E. Water permeability and water/salt selectivity tradeoff in polymers for desalination. *J. Membr. Sci.* 2011, 369 (1-2), 130-138.

Park, H. B.; Kamcev, J.; Robeson, L. M.; Elimelech, M.; Freeman, B. D. Maximizing the right stuff: The trade-off between membrane permeability and selectivity. *Science* 2017, 356 (6343), 1137.

Liao, Z.; Zhu, J.; Li, X.; Van der Bruggen, B. Regulating composition and structure of nanofillers in thin film nanocomposite (TFN) membranes for enhanced separation performance: A critical review. *Sep. Purif. Technol.* 2021, 266, 118567.

Bi, R.; Zhang, Q.; Zhang, R.; Su, Y.; Jiang, Z. Thin film nanocomposite membranes incorporated with graphene quantum dots for high flux and antifouling property. *J. Membr. Sci.* 2018, 553, 17-24.

Zarrabi, H.; Yekavalangi, M. E.; Vatanpour, V.; Shockravi, A.; Safarpour, M. Improvement in desalination performance of thin film nanocomposite nanofiltration membrane using amine-functionalized multiwalled carbon nanotube. *Desalination* 2016, 394, 83-90.

Zhu, J.; Qin, L.; Uliana, A.; Hou, J.; Wang, J.; Zhang, Y.; Li, X.; Yuan, S.; Li, J.; Tian, M.; Lin, J.; Van der Bruggen, B. Elevated performance of thin film nanocomposite membranes enabled by modified hydrophilic MOFs for nanofiltration. *ACS Appl. Mater. Interfaces* 2017, 9 (2), 1975-1986.

Dong, L.-x.; Huang, X.-c.; Wang, Z.; Yang, Z.; Wang, X.-m.; Tang, C. Y. A thin-film nanocomposite nanofiltration membrane prepared on a support with in situ embedded zeolite nanoparticles. *Sep. Purif. Technol.* 2016, 166, 230-239.

Lai, G.; Lau, W.; Goh, P.; Ismail, A.; Yusof, N.; Tan, Y. Graphene oxide incorporated thin film nanocomposite nanofiltration membrane for enhanced salt removal performance. *Desalination* 2016, 387, 14-24.

Rajaeian, B.; Rahimpour, A.; Tade, M. O.; Liu, S. Fabrication and characterization of polyamide thin film nanocomposite (TFN) nanofiltration membrane impregnated with TiO2 nanoparticles. *Desalination* 2013, 313, 176-188.

Zhang, Y.; Cheng, X.; Jiang, X.; Urban, J. J.; Lau, C. H.; Liu, S.; Shao, L. Robust natural nanocomposites realizing unprecedented ultrafast precise molecular separations. *Mater. Today* 2020, 36, 40-47.

Yang, Z.; Sun, P.-F.; Li, X.; Gan, B.; Wang, L.; Song, X.; Park, H.-D.; Tang, C. Y. A critical review on thin-film nanocomposite membranes with interlayered structure: mechanisms, recent develop-ments, and environmental applications. *Environ. Sci. Technol.* 2020, 54 (24), 15563-15583.

Ji, C.; Zhai, Z.; Jiang, C.; Hu, P.; Zhao, S.; Xue, S.; Yang, Z.; He, T.; Niu, Q. J. Recent advances in high-performance TFC membranes: A review of the functional interlayers. *Desalination* 2021, 500, 114869.

Choi, H.-g.; Shah, A. A.; Nam, S.-E.; Park, Y.-I.; Park, H. Thin-film composite membranes comprising ultrathin hydrophilic polydopamine interlayer with graphene oxide for forward osmosis. *Desalination* 2019, 449, 41-49.

Gao, S.; Zhu, Y.; Gong, Y.; Wang, Z.; Fang, W.; Jin, J. Ultrathin polyamide nanofiltration membrane fabricated on brush-painted single-walled carbon nanotube network support for ion sieving. *ACS Nano* 2019, 13 (5), 5278-5290.

Li, Y.; Su, Y.; Li, J.; Zhao, X.; Zhang, R.; Fan, X.; Zhu, J.; Ma, Y.; Liu, Y.; Jiang, Z. Preparation of thin film composite nanofiltration membrane with improved structural stability through the mediation of polydopamine. *J. Membr. Sci.* 2015, 476, 10-19.

Sun, P.-F.; Yang, Z.; Song, X.; Lee, J. H.; Tang, C. Y.; Park, H.-D. Interlayered Forward Osmosis Membranes with Ti3C2T x MXene and Carbon Nanotubes for Enhanced Municipal Wastewater Concentration. *Environ. Sci. Technol.* 2021, 55 (19), 13219-13230.

Yang, Z.; Wang, F.; Guo, H.; Peng, L. E.; Ma, X.-h.; Song, X.-x.; Wang, Z.; Tang, C. Y. Mechanistic Insights into the Role of Polydopamine Interlayer toward Improved Separation Performance of Polyamide Nanofiltration Membranes. *Environ. Sci. Technol.* 2020, 54 (18), 11611-11621.

Yang, C.; Li, S.; Lv, X.; Li, H.; Han, L.; Su, B. Effectively regulating interfacial polymerization process via in-situ constructed 2D COFs interlayer for fabricating organic solvent nanofiltration membranes. *J. Membr. Sci.* 2021, 637, 119618.

Karan, S.; Jiang, Z.; Livingston, A. G. Sub-10 nm polyamide nanofilms with ultrafast solvent transport for molecular separation. *Science* 2015, 348 (6241), 1347-1351.

Sun, H.; Liu, J.; Luo, X.; Chen, Y.; Jiang, C.; Zhai, Z.; Niu, Q. J. Fabrication of thin-film composite polyamide nanofiltration membrane based on polyphenol intermediate layer with enhanced desalination performance. *Desalination* 2020, 488, 114525.

Kattula, M.; Ponnuru, K.; Zhu, L.; Jia, W.; Lin, H.; Furlani, E. P. Designing ultrathin film composite membranes: The impact of a gutter layer. *Sci. Rep.* 2015, 5 (1), 1-9.

Liang, C. Z.; Chung, T.-S.; Lai, J.-Y. A review of polymeric composite membranes for gas separation and energy production. *Prog. Polym. Sci.* 2019, 97, 101141.

Wu, X.; Ding, M.; Xu, H.; Yang, W.; Zhang, K.; Tian, H.; Wang, H.; Xie, Z. Scalable ti3c2t x mxene interlayered forward osmosis membranes for enhanced water purification and organic solvent recovery. *ACS Nano* 2020, 14 (7), 9125-9135.

Ritt, C. L.; Werber, J. R.; Deshmukh, A.; Elimelech, M. Monte Carlo simulations of framework defects in layered two-dimensional nanomaterial desalination membranes: implications for permeability and selectivity. *Environ. Sci. Technol.* 2019, 53 (11), 6214-6224.

Khanzada, N. K.; Farid, M. U.; Kharraz, J. A.; Choi, J.; Tang, C. Y.; Nghiem, L. D.; Jang, A.; An, A. K. Removal of organic micropollutants using advanced membrane-based water and wastewater treatment: A review. *Journal of membrane science* 2020, 598, 117672.

Tang, C. Y.; Yang, Z.; Guo, H.; Wen, J. J.; Nghiem, L. D.; Cornelissen, E. Potable Water Reuse through Advanced Membrane Technology. *Environ. Sci. Technol.* 2018, 52 (18), 10215-10223.

Yang, Z.; Guo, H.; Tang, C. Y. The upper bound of thin-film composite (TFC) polyamide membranes for desalination. *J. Membr. Sci.* 2019, 590, 117297.

Khazaei, M.; Arai, M.; Sasaki, T.; Chung, C.-Y.; Venkataramanan, N. S.; Estili, M.; Sakka, Y.; Kawazoe, Y. Novel Electronic and Magnetic Properties of Two-Dimensional Transition Metal Carbides and Nitrides. *Adv. Funct. Mater.* 2013, 23 (17), 2185-2192.

Schmid, N.; Eichenberger, A. P.; Choutko, A.; Riniker, S.; Winger, M.; Mark, A. E.; van Gunsteren, W. F. Definition and testing of the GROMOS force-field versions 54A7 and 54B7. *Eur. Biophys. J.* 2011, 40 (7), 843.

Nishiyama, Y.; Langan, P.; Chanzy, H. Crystal Structure and Hydrogen-Bonding System in Cellulose Iβ from Synchrotron X-ray and Neutron Fiber Diffraction. *J. Am. Chem. Soc.* 2002, 124 (31), 9074-9082.

Ding, L.; Wei, Y.; Li, L.; Zhang, T.; Wang, H.; Xue, J.; Ding, L.-X.; Wang, S.; Caro, J.; Gogotsi, Y. MXene molecular sieving membranes for highly efficient gas separation. *Nat. Commun.* 2018, 9 (1), 155.

Gao, H.; Wang, Y.; Afolabi, M. A.; Xiao, D.; Chen, Y. Incorporation of Cellulose Nanocrystals into Graphene Oxide Membranes for Efficient Antibiotic Removal at High Nutrient Recovery. *ACS Appl. Mater. Interfaces* 2021, 13 (12), 14102-14111.

Ding, L.; Wei, Y.; Wang, Y.; Chen, H.; Caro, J.; Wang, H. A Two-Dimensional Lamellar Membrane: MXene Nanosheet Stacks. *Angew. Chem., Int. Ed.* 2017, 56 (7), 1825-1829.

Xue, S.; Lin, C.-W.; Ji, C.; Guo, Y.; Liu, L.; Yang, Z.; Zhao, S.; Cai, X.; Niu, Q. J.; Kaner, R. B. Thin-Film Composite Membranes with a Hybrid Dimensional Titania Interlayer for Ultrapermeable Nanofiltration. *Nano Lett.* 2022, 22 (3), 1039-1046.

Zhang, W.-H.; Yin, M.-J.; Zhao, Q.; Jin, C.-G.; Wang, N.; Ji, S.; Ritt, C. L.; Elimelech, M.; An, Q.-F. Graphene oxide membranes with stable porous structure for ultrafast water transport. *Nat. Nanotechnol.* 2021, 16 (3), 337-343.

Wu, X.; Yang, L.; Shao, W.; Lu, X.; Liu, X.; Li, M. Fabrication of high performance TFN membrane incorporated with graphene oxide via support-free interfacial polymerization. *Science of The Total Environment* 2021, 793, 148503.

Liu, Y.-l.; Wang, X.-m.; Yang, H.-w.; Xie, Y. F.; Huang, X. Preparation of nanofiltration membranes for high rejection of organic micropollutants and low rejection of divalent cations. *J. Membr. Sci.* 2019, 572, 152-160.

Zhang, X.; Lv, Y.; Yang, H.-C.; Du, Y.; Xu, Z.-K. Polyphenol coating as an interlayer for thin-film composite membranes with enhanced nanofiltration performance. *ACS Appl. Mater. Interfaces* 2016, 8 (47), 32512-32519.

Tan, Z.; Chen, S.; Peng, X.; Zhang, L.; Gao, C. Polyamide membranes with nanoscale Turing structures for water purification. *Science* 2018, 360 (6388), 518-521.

Zhao, H.; Qiu, S.; Wu, L.; Zhang, L.; Chen, H.; Gao, C. Improving the performance of polyamide reverse osmosis membrane by incorporation of modified multi-walled carbon nanotubes. *J. Membr. Sci.* 2014, 450, 249-256.

Zhu, J.; Qin, L.; Uliana, A.; Hou, J.; Wang, J.; Zhang, Y.; Li, X.; Yuan, S.; Li, J.; Tian, M.; Lin, J.; Van der Bruggen, B. Elevated Performance of Thin Film Nanocomposite Membranes Enabled by Modified Hydrophilic MOFs for Nanofiltration. *ACS Appl. Mater. Interfaces* 2017, 9 (2), 1975-1986.

Ghosh, A. K.; Hoek, E. M. V. Impacts of support membrane structure and chemistry on polyamide-polysulfone interfacial composite membranes. *J. Membr. Sci.* 2009, 336 (1), 140-148.

Jimenez Solomon, M. F.; Bhole, Y.; Livingston, A. G. High flux membranes for organic solvent nanofiltration (OSN)-Interfacial polymerization with solvent activation. *J. Membr. Sci.* 2012, 423-424, 371-382.

Xue, S.; Lin, C.-W.; Ji, C.; Guo, Y.; Liu, L.; Yang, Z.; Zhao, S.; Cai, X.; Niu, Q. J.; Kaner, R. B. Thin-Film Composite Membranes with a Hybrid Dimensional Titania Interlayer for Ultrapermeable Nanofiltration. *Nano Lett.* 2022, 22 (3), 1039-1046.

Wang, Z.; Wang, Z.; Lin, S.; Jin, H.; Gao, S.; Zhu, Y.; Jin, J. Nanoparticle-templated nanofiltration membranes for ultrahigh performance desalination. *Nat. Commun.* 2018, 9 (1), 1-9.

Jiang, C.; Tian, L.; Zhai, Z.; Shen, Y.; Dong, W.; He, M.; Hou, Y.; Niu, Q. J. Thin-film composite membranes with aqueous template-induced surface nanostructures for enhanced nanofiltration. *J. Membr. Sci.* 2019, 589, 117244.

Yang, X.; Du, Y.; Zhang, X.; He, A.; Xu, Z.-K. Nanofiltration membrane with a mussel-inspired interlayer for improved permeation performance. *Langmuir* 2017, 33 (9), 2318-2324.

Wijmans, J.; Hao, P. Influence of the porous support on diffusion in composite membranes. *Journal of membrane science* 2015, 494, 78-85.

Ramon, G. Z.; Wong, M. C. Y.; Hoek, E. M. V. Transport through composite membrane, part 1: Is there an optimal support membrane? *J. Membr. Sci.* 2012, 415-416, 298-305.

Kattula, M.; Ponnuru, K.; Zhu, L.; Jia, W.; Lin, H.; Furlani, E. P. Designing ultrathin film composite membranes: the impact of a gutter layer. *Sci. Rep.* 2015, 5 (1), 15016.

Long, L.; Wu, C.; Yang, Z.; Tang, C. Y. Carbon Nanotube Interlayer Enhances Water Permeance and Antifouling Performance of Nanofiltration Membranes: Mechanisms and Experimental Evidence. *Environ. Sci. Technol.* 2022, 56 (4), 2656-2664.

Zhu, X.; Cheng, X.; Luo, X.; Liu, Y.; Xu, D.; Tang, X.; Gan, Z.; Yang, L.; Li, G.; Liang, H. Ultrathin Thin-Film Composite Polyamide Membranes Constructed on Hydrophilic Poly(vinyl alcohol) Decorated Support Toward Enhanced Nanofiltration Performance. *Environ. Sci. Technol.* 2020, 54 (10), 6365-6374.

Yang, Z.; Zhou, Z.-w.; Guo, H.; Yao, Z.; Ma, X.-h.; Song, X.; Feng, S.-P.; Tang, C. Y. Tannic Acid/Fe3+ Nanoscaffold for Interfacial Polymerization: Toward Enhanced Nanofiltration Performance. *Environ. Sci. Technol.* 2018, 52 (16), 9341-9349.

Yang, X. Controllable Interfacial Polymerization for Nanofiltration Membrane Performance Improvement by the Polyphenol Interlayer. *ACS Omega* 2019, 4 (9), 13824-13833.

Gong, G.; Wang, P.; Zhou, Z.; Hu, Y. New insights into the role of an interlayer for the fabrication of highly selective and permeable thin-film composite nanofiltration membrane. *ACS Appl. Mater. Interfaces* 2019, 11 (7), 7349-7356.

Yang, X.; Huang, J.; Yang, F.; Wang, W.; Xue, C.; Zhou, W.; Wu, Y.; Shao, L.; Zhang, Y. Metal-organophosphate biphasic interfacial coordination reaction synthesizing nanofiltration membranes with the ultrathin selective layer, excellent acid-resistance and antifouling performance. *J. Membr. Sci.* 2022, 653, 120521.

Gao, H.; Zhong, S.; Zhang, W.; Igou, T.; Berger, E.; Reid, E.; Zhao, Y.; Lambeth, D.; Gan, L.; Afolabi, M. A.; Tong, Z.; Lan, G.; Chen, Y. Revolutionizing Membrane Design Using Machine Learning-Bayesian Optimization. *Environ. Sci. Technol.* 2022, 56 (4), 2572-2581.

Liang, Y.; Zhu, Y.; Liu, C.; Lee, K.-R.; Hung, W.-S.; Wang, Z.; Li, Y.; Elimelech, M.; Jin, J.; Lin, S. Polyamide nanofiltration membrane with highly uniform sub-nanometre pores for sub-1 Å precision separation. *Nat. Commun.* 2020, 11 (1), 1-9.

Nason, J. A.; McDowell, S. A.; Callahan, T. W. Effects of natural organic matter type and concentration on the aggregation of citrate-stabilized gold nanoparticles. *J. Environ. Monit.* 2012, 14 (7), 1885-1892.

Ghidiu, M.; Lukatskaya, M. R.; Zhao, M.-Q.; Gogotsi, Y.; Barsoum, M. W., Conductive two-dimensional titanium carbide 'clay' with high volumetric capacitance. *Nature* 2014, 516, (7529), 78.

Riazi, H.; Anayee, M.; Hantanasirisakul, K.; Shamsabadi, A. A.; Anasori, B.; Gogotsi, Y.; Soroush, M., Surface modification of a MXene by an aminosilane coupling agent. *Advanced Materials Interfaces* 2020, 7, (6), 1902008.

Tang, C. Y.; Kwon, Y.-N.; Leckie, J. O., Effect of membrane chemistry and coating layer on physiochemical properties of thin film composite polyamide RO and NF membranes: I. FTIR and XPS characterization of polyamide and coating layer chemistry. *Desalination* 2009, 242, (1-3), 149-167.

Chen, G.-E.; Liu, Y.-J.; Xu, Z.-L.; Tang, Y.-J.; Huang, H.-H.; Sun, L., Fabrication and characterization of a novel nanofiltration membrane by the interfacial polymerization of 1,4-diaminocyclohexane (DCH) and trimesoyl chloride (TMC). *RSC Advances* 2015, 5, (51), 40742-40752.

Liang, Y.; Zhu, Y.; Liu, C.; Lee, K.-R.; Hung, W.-S.; Wang, Z.; Li, Y.; Elimelech, M.; Jin, J.; Lin, S., Polyamide nanofiltration membrane with highly uniform sub-nanometre pores for sub-1 Å precision separation. *Nature communications* 2020, 11, (1), 1-9.

Marcus, Y., Thermodynamics of solvation of ions. Part 5.-Gibbs free energy of hydration at 298.15 K. *Journal of the Chemical Society, Faraday Transactions* 1991, 87, (18), 2995-2999.

Muckley, E. S.; Naguib, M.; Wang, H.-W.; Vlcek, L.; Osti, N. C.; Sacci, R. L.; Sang, X.; Unocic, R. R.; Xie, Y.; Tyagi, M., Multimodality of structural, electrical, and gravimetric responses of intercalated MXenes to water. *ACS nano* 2017, 11, (11), 11118-11126.

Bjørlo, A. Intercalation of $CO_2$, water and diglyme in MXenes using molecular simulations. NTNU, 2018.

What is claimed is:

1. A membrane comprising a substrate, an interlayer, and a polymer layer, wherein the interlayer is disposed on a surface of the substrate and the polymer layer is disposed on a surface of the interlayer opposite the substrate, further wherein the substrate comprises a thermoplastic, the interlayer comprises a two-dimensional nanomaterial and cellulose nanocrystals (CNC), and the polymer layer comprises a polymer.

2. The membrane of claim 1, wherein the thermoplastic comprises a polysulfone.

3. The membrane of claim 2, wherein the polysulfone comprises a polyether sulfone (PES).

4. The membrane of claim 1, wherein the CNC are intercalated into the two-dimensional nanomaterial.

5. The membrane of claim 1, wherein the two-dimensional nanomaterial comprises MXene.

6. The membrane of claim 5, wherein the MXene comprises $Ti_4C_3O_2$.

7. The membrane of claim 1, wherein the two-dimensional nanomaterial comprises graphite oxide, molybdenum disulfide, tungsten disulfide, or any combination thereof.

8. The membrane of claim 1, wherein the membrane comprises from about 10 to 14% of CNC by weight.

9. The membrane of claim 1, wherein the polymer comprises a polyamide.

10. The membrane of claim 1, wherein the membrane has a pore size of from 0.30 nm to 0.40 nm.

11. The membrane of claim 1, wherein the membrane has a molecular weight cut off (MWCO) of from 261 Da to 336 Da.

12. The membrane of claim 1, wherein the membrane has a cross-linking degree of a range from 74.64% to 89.1%.

13. The membrane of claim 1, wherein the membrane has a water permeability of a range from 17.81 to 31.68 LMH $bar^{-1}$.

14. The membrane of claim 1, wherein the membrane is configured to reject from 99.0 to 99.8% of salt ions.

15. The membrane of claim 1, wherein the membrane is configured to reject 80% or more of heavy metal ions.

16. The membrane of claim 1, wherein the membrane is configured to reject 80% or more of antibiotics.

17. A method of water filtration, comprising filtering a water mixture through the membrane of claim 1.

18. A method of separating a first solute and a second solute, comprising filtering a substance comprising the first solute and the second solute with the membrane of claim 1, resulting in a retentate and permeate, wherein the retentate comprises the first solute and the permeate comprises the second solute.

19. A method of per- and polyfluoroalkyl substance (PFAS) removal comprising filtering a substance comprising PFAS through the membrane of claim 1, resulting in a retentate and a permeate.

20. The method of claim 19, wherein the retentate comprises the PFAS.

21. The method of claim 20, wherein the permeate is substantially free of PFAS.

22. The method of claim 21, wherein the permeate is free of PFAS.

* * * * *